US008849660B2

(12) United States Patent
Rodriguez et al.

(10) Patent No.: US 8,849,660 B2
(45) Date of Patent: Sep. 30, 2014

(54) TRAINING OF VOICE-CONTROLLED TELEVISION NAVIGATION

(76) Inventors: Arturo A. Rodriguez, Norcross, GA (US); David A. Sedacca, Atlanta, GA (US); Albert Garcia, Suwanee, GA (US)

(*) Notice: Subject to any disclaimer, the term of this patent is extended or adjusted under 35 U.S.C. 154(b) by 1015 days.

(21) Appl. No.: 11/956,675

(22) Filed: Dec. 14, 2007

(65) Prior Publication Data

US 2008/0091434 A1    Apr. 17, 2008

Related U.S. Application Data

(63) Continuation of application No. 11/032,438, filed on Jan. 10, 2005, now Pat. No. 7,321,857, which is a continuation of application No. 10/010,497, filed on Dec. 3, 2001, now Pat. No. 6,889,191.

(51) Int. Cl.
*G10L 15/00* (2013.01)

(52) U.S. Cl.
USPC ........... 704/233; 704/243; 704/251; 704/270; 704/275; 381/58; 381/59

(58) Field of Classification Search
USPC ........... 704/233, 243, 251, 270, 275; 381/58, 381/59
See application file for complete search history.

(56) References Cited

U.S. PATENT DOCUMENTS

| | | | |
|---|---|---|---|
| 4,694,498 A * | 9/1987 | Suzuki et al. ................. 381/103 |
| 5,267,323 A | 11/1993 | Kimura |
| 5,319,736 A | 6/1994 | Hunt |
| 5,377,303 A * | 12/1994 | Firman ......................... 704/275 |
| 5,410,595 A * | 4/1995 | Park et al. ................ 379/406.08 |
| 5,724,416 A | 3/1998 | Foladare et al. |
| 5,752,232 A | 5/1998 | Basore et al. |
| 5,774,859 A * | 6/1998 | Houser et al. ................. 704/275 |
| 5,802,467 A | 9/1998 | Salazar et al. |
| 5,893,064 A * | 4/1999 | Kudirka et al. ............ 704/270.1 |
| 5,900,867 A | 5/1999 | Schindler et al. |
| 5,909,666 A * | 6/1999 | Gould et al. .................. 704/251 |
| 5,999,799 A | 12/1999 | Hu et al. |
| 6,067,278 A * | 5/2000 | Owens et al. ................. 704/270 |
| 6,349,285 B1 * | 2/2002 | Liu et al. ....................... 704/500 |
| 6,397,186 B1 * | 5/2002 | Bush et al. .................... 704/274 |
| 6,405,239 B1 | 6/2002 | Addington et al. |
| 6,430,535 B1 * | 8/2002 | Spille et al. .................. 704/500 |
| 6,456,978 B1 * | 9/2002 | Wymore et al. ............... 704/275 |
| 6,477,492 B1 * | 11/2002 | Connor ......................... 704/236 |

(Continued)

FOREIGN PATENT DOCUMENTS

WO    WO 00/18066    3/2000

OTHER PUBLICATIONS

International Search Report dated Mar. 13, 2003 in WO 03/049003.

*Primary Examiner* — Pierre-Louis Desir
*Assistant Examiner* — Fariba Sirjani
(74) *Attorney, Agent, or Firm* — Merchant & Gould

(57) ABSTRACT

Systems and methods for training voice activation control of electronic equipment are disclosed. One example method includes receiving a selection corresponding to at least one command used to control the electronic equipment. The method further includes instructing a user to speak, and responsive to the instruction, receiving a digitized speech stream. The method further includes segmenting the speech stream into speech segments, storing at least one of the speech segments as an entry in a dictionary, and associating the dictionary entry with the selected command.

12 Claims, 9 Drawing Sheets

(56) References Cited

U.S. PATENT DOCUMENTS

| | | | |
|---|---|---|---|
| 6,587,824 B1 * | 7/2003 | Everhart et al. | 704/275 |
| 6,654,721 B2 * | 11/2003 | Handelman | 704/270 |
| 6,766,290 B2 * | 7/2004 | Grau | 704/211 |
| 6,816,837 B1 * | 11/2004 | Davis | 704/275 |
| 6,889,191 B2 * | 5/2005 | Rodriguez et al. | 704/275 |
| 6,970,568 B1 * | 11/2005 | Freeman et al. | 381/58 |
| 7,321,857 B2 * | 1/2008 | Rodriguez et al. | 704/275 |
| 7,340,062 B2 * | 3/2008 | Revit et al. | 381/60 |

\* cited by examiner

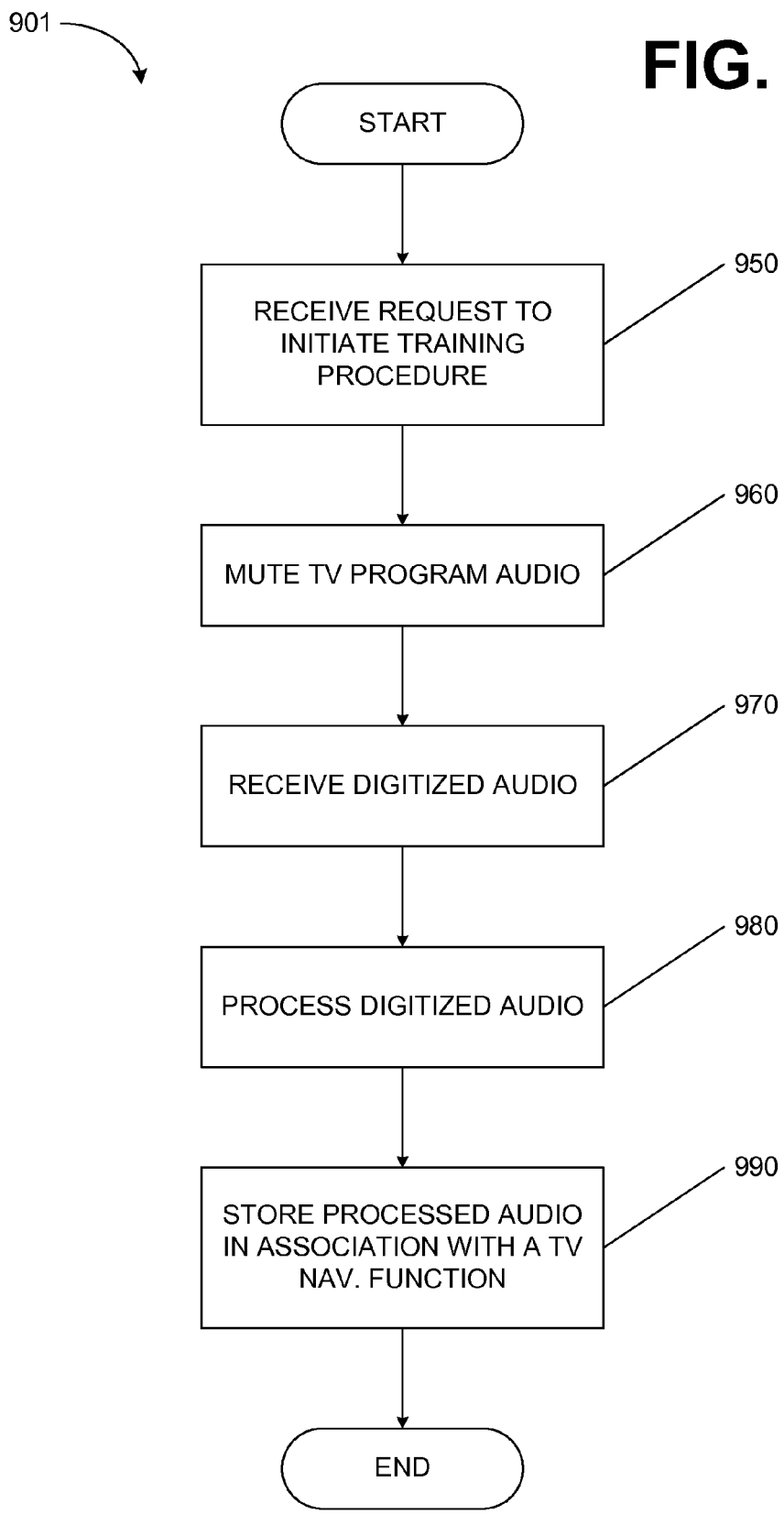

TRAINING OF VOICE-CONTROLLED TELEVISION NAVIGATION

CROSS-REFERENCE TO RELATED APPLICATION

This application is a continuation of U.S. Ser. No. 11/032,438, filed Jan. 10, 2005, now U.S. Pat. No. 7,321,857, issued Jan. 22, 2008, which is a continuation of U.S. Ser. No. 10/010,497, filed Dec. 3, 2001, now U.S. Pat. No. 6,889,191, issued May 3, 2005, both of which are incorporated herein by reference in their entirety.

FIELD OF THE INVENTION

This invention relates in general to the field of electronics, and more particularly, to speech recognition activated controls for electronics such as home communication terminals.

BACKGROUND

Historically, television services have been comprised of analog broadcast audio and video signals. Cable television systems now receive broadcasts and retransmit them with other programming to users over land-line networks, typically comprising fiber optic cable And/or coaxial cable. With the recent advent of digital transmission technology, cable television systems are now capable of providing much more than the traditional analog broadcast video. For instance, two-way and advanced one-way communications between a subscriber and a cable system headend are now possible.

In implementing enhanced programming, the home communication terminal ("HCT"), otherwise known as the set top box, has become an important computing device for accessing video services and navigating a subscriber through a maze of available services. In addition to supporting traditional analog broadcast video functionality, digital HCTs (or "DHCTs") now also support an increasing number of services which employ digital two-way communications, such as video-on-demand, email and web-browsing. These are all in addition to the host of other television services which are increasingly being demanded by consumers, examples of which include audio and audio/visual programming, advanced navigation controls, impulse pay-per-view technology, and on-line commerce.

With the addition of interactive services and the increased bandwidth and the emergence of bi-directional communication capabilities available through a digital television system, there is a need to provide subscribers new methods of controlling DHCT capabilities and accessing the channels and/or services with relative ease. Currently, controlling the DHCT to access these services requires familiarization and use of input devices such as an infrared wireless remote control or a wired or wireless keyboard. Conventional remote control systems for audio and video equipment normally comprise a battery-powered, hand-held, transmitter which encodes and transmits selected keyboard information and generates the necessary control signals for operating the selected functions of the user's equipment. Most such systems employ a transmission system operable in the infrared region of the spectrum for transmitting the control data. Such a device allows one to operate the equipment from a distance, without connecting wires. The drawback with such communication equipment is that subscribers need to familiarize themselves with increasingly complicated remote control devices to control and select the myriad of services and programming available. Furthermore, as operators of cable television systems continue to add services and applications, problems also exist in both making the subscriber aware of and also in providing quick access to the new services and channels.

Voice activated remote controls for controlling televisions, video cassette recorders, stereo equipment, and cable and satellite receivers are well known. There, voice activated remotes typically recognize a limited number of voice commands from a limited number of users. Using the voice activated remote, users can select a hands free or manual operation mode. The device performs speech recognition and associated DSP processing in the remote control device, and transmits signals representing the function to the device to which it controls. However, a drawback with such a device is that it is limited in the number of commands that may be processed, and by the number of users that can use the device.

In one embodiment, transport stream output by multiplexer 910 may undergo adaptation to a network layer such internet protocol (IP) at the DSP 904 or multiplexer 910 prior to error correction and modulation 912 wherein the error correction and modulation 912 is performed to fulfill the physical layer in part. Furthermore, packets output by network layer adaptation may further undergo adaptation to a link layer, such as Ethernet, for framing.

SUMMARY OF THE INVENTION

The present invention is a method, apparatus and system for receiving speech commands at a remote control device, digitizing those speech commands, and transmitting the digitized speech commands to a DCHT, at which the speech commands may be interpreted so as to allow the remote control user to control the DHCT. Because speech recognition is performed at the DHCT, rather than at the remote control device, the remote control device does not have to interpret and transmit infrared signals that represent user commands. This simplifies the processing and voice recognition capabilities required by the remote control device. Additionally, because the DHCT processes the digitized voice received from the remote control device, the DHCT can negate the effect of sounds, such as television sounds, produced by the DHCT and captured by the microphone on the remote control device. This results in a greater capability of the DHCT to interpret user commands.

According to one embodiment of the present invention there is disclosed a method of using voice activated commands to instruct electronic equipment to perform one or more functions. The method includes receiving at a remote control device speech representing a user command, digitizing the speech at the remote control device, and compressing the digitized speech. The method further includes transmitting the compressed digitized speech wirelessly to the electronic equipment, receiving the compressed digitized speech at the electronic equipment, decompressing the digitized speech, and performing at the electronic equipment a function based upon a stored instruction associated with the digitized speech.

According to one aspect of the present invention, receiving at a remote control device speech representing a user command includes receiving at a remote control device user instructions and unwanted ambient audio. According to another aspect of the present invention, transmitting the compressed digitized speech wirelessly includes transmitting the compressed digitized speech over a wireless data channel or a wireless media channel. Additionally, transmitting the compressed digitized can include transmitting the digitized speech via a transmission antenna, and receiving the compressed digitized speech comprises receiving the compressed digitized speech via a receiver antenna.

According to another aspect of the present invention, the method further includes the step of comparing at least a portion of the decompressed digitized speech to a dictionary of speech segments, where the dictionary of speech segments are pre-programmed by a user. The method can also include the step of subtracting the unwanted ambient audio from the decompressed digitized speech. The step of subtracting the unwanted ambient audio from the decompressed digitized speech can also occur before the at least a portion of the digitized speech is compared to the dictionary of speech segments. According to one aspect of the invention, the unwanted ambient audio is generated by the electronic equipment, and may be emitted by a speaker associated with a television set.

According to yet another embodiment of the present invention the method further includes the step of storing the unwanted ambient audio in the electronic equipment. Additionally, the method may also include the step of storing a time-shifted version of the unwanted ambient audio in the electronic equipment. Moreover, according to the present invention, the time-shifted version of the unwanted ambient audio can be matched with the unwanted ambient audio generated by the electronic equipment, and the unwanted ambient audio may be subtracted the unwanted ambient audio from the decompressed digitized speech.

According to yet another aspect of the present invention, the method further includes the step of identifying a dictionary speech segment associated with at least a portion of the decompressed digitized speech. Furthermore, the method may include the step of graphically displaying or audibly identifying the function associated with at least one dictionary speech segment. According to another aspect of the invention, comparing at least a portion of the decompressed digitized speech to a dictionary of speech segments further includes producing a matching score representing the likelihood of a match between the at least one portion of the decompressed digitized speech and at least one speech segment in the dictionary of speech segments.

According to a further aspect of the present invention, the electronic equipment is a digital home communication terminal, such as a cable television digital home communication terminal or a satellite digital home communication terminal. According to one aspect of the invention, the compressed digitized speech controls an electronic program guide navigation of the electronic equipment, which is associated with a television and the electronic program guide navigation is presentable on the television. The decompressed digital speech can also control an electronic program guide navigation of the electronic equipment. Additionally, the method can include the step of querying a user for said speech representing a user command.

According to another embodiment of the present invention, there is disclosed a remote control apparatus that receives voice activated commands. The remote control apparatus of the present invention includes a first microphone and an enable microphone button, wherein the at least one enable microphone button activates the first microphone such that the first microphone can receive one or more inputs. The remote control apparatus additionally includes at least one processor for digitizing inputs received at the first microphone, and at least one transmitter for wirelessly transmitting the digitized inputs to a device associated with the remote control apparatus.

According to one aspect of the present invention, the one or more inputs comprise voice commands. According to another aspect of the invention, the remote control apparatus also includes a plurality of function keys. Additionally, the one or more inputs include the pressing of at least of the plurality of function keys in combination with one or more voice commands. Furthermore, according to one aspect of the present invention, at least one function key of the plurality of function keys is selected from the group consisting of a toggle switch, a button, and a spring-force level switch.

According to yet another aspect of the present invention, the remote control apparatus further includes at least one standby command that identifies when the at least one enable microphone button is enabled. The remote control apparatus can also include a digital signal filter, such as a band pass filter, which it operative to reduce ambient noise received by the first microphone. Additionally, according to one aspect of the present invention the at least one processor of the remote control apparatus is operative to digitize one or more inputs received by the second microphone. According to yet another aspect of the invention, the remote control apparatus further includes a second microphone, where the second microphone is operative to assist in canceling noise received by the first microphone. Moreover the remote control apparatus can further include at least one speech encoder that encodes speech received at the first microphone when the speech is below a threshold value determined by the at least one processor.

According to yet another embodiment of the present invention, there is disclosed a home communication terminal that receives voice activated commands and, based upon the voice activated commands, instructs electronic equipment to perform one or more functions. The home communication terminal includes a receiver, which receives encoded digitized signals from at least one remote device, where the encoded digitized signals include one or more signals representing at least one voice activated command. The home communication terminal also includes at least one speech decoder, which decodes the encoded digitized signals, at least one memory, which stores at least a portion of the decoded digitized signals, and at least one audio buffer, for storing audio signals broadcasted by a device in electrical communication with the receiver. Additionally, the home communication terminal of the present invention includes at least one processor, for eliminating stored audio signals from the decoded digitized signals, such that the resulting decoded digitized signals do not contain audio signals broadcasted by the device in electrical communication with the receiver, and at least one comparison component, where the at least one comparison component matches at least a portion of the resulting decoded digital signals to one or more commands representing at least one function the home communication terminal is operative to perform.

According to one aspect of the present invention the encoded digitized signals received by the home communication terminal include unwanted signals. According to another aspect of the present invention the home communication terminal further includes at least one digital signal filter operative to reduce the unwanted signals in the decoded digitized signals. According to yet another aspect of the invention the home communication terminal of the present invention further includes an infrared receiver that receives infrared commands transmitted from the at least one remote device. Additionally, the home communication terminal may also be associated with an Internet Protocol address.

According to a further aspect of the present invention the home communication terminal includes an electronic program guide application controllable by the at least one remote device via the at least one voice activated command. The at least one memory can include a dictionary of terms, wherein each term is associated with the one or more commands representing the at least on function the home communication terminal is operative to perform. According to a further aspect of the invention, the home communication terminal includes a training procedure application, where the dictionary of terms is constructed during a training procedure effected by the processor in conjunction with a training procedure application. Additionally, each term in the dictionary of terms may be associated with one or more commands representing a navigation task the home communication terminal is operative to perform.

According to yet another aspect of the present invention, the training procedure application averages multiple versions of user-generated voice commands input during the training procedure. The training procedure application also calculates the time delay between audio signals broadcasted by a device in electrical communication with the receiver and at least some of the unwanted signals. The home communication terminal can also include a graphical user interface application that operates in conjunction with the processor to display the one or more commands representing at least one function the home communication terminal is operative to perform.

According to another embodiment of the invention the home communication terminal includes a timer that is operative to time-match the audio signals generated by the device in electrical communication with the receiver with the encoded digitized signals received by the receiver. The home communication terminal may also include at least one microphone for receiving audio signals.

Many objects, features and advantages of the present invention will become apparent to one of ordinary skill in the art upon examination of the following drawings and detailed description.

BRIEF DESCRIPTION OF THE DRAWINGS

Figure 1:
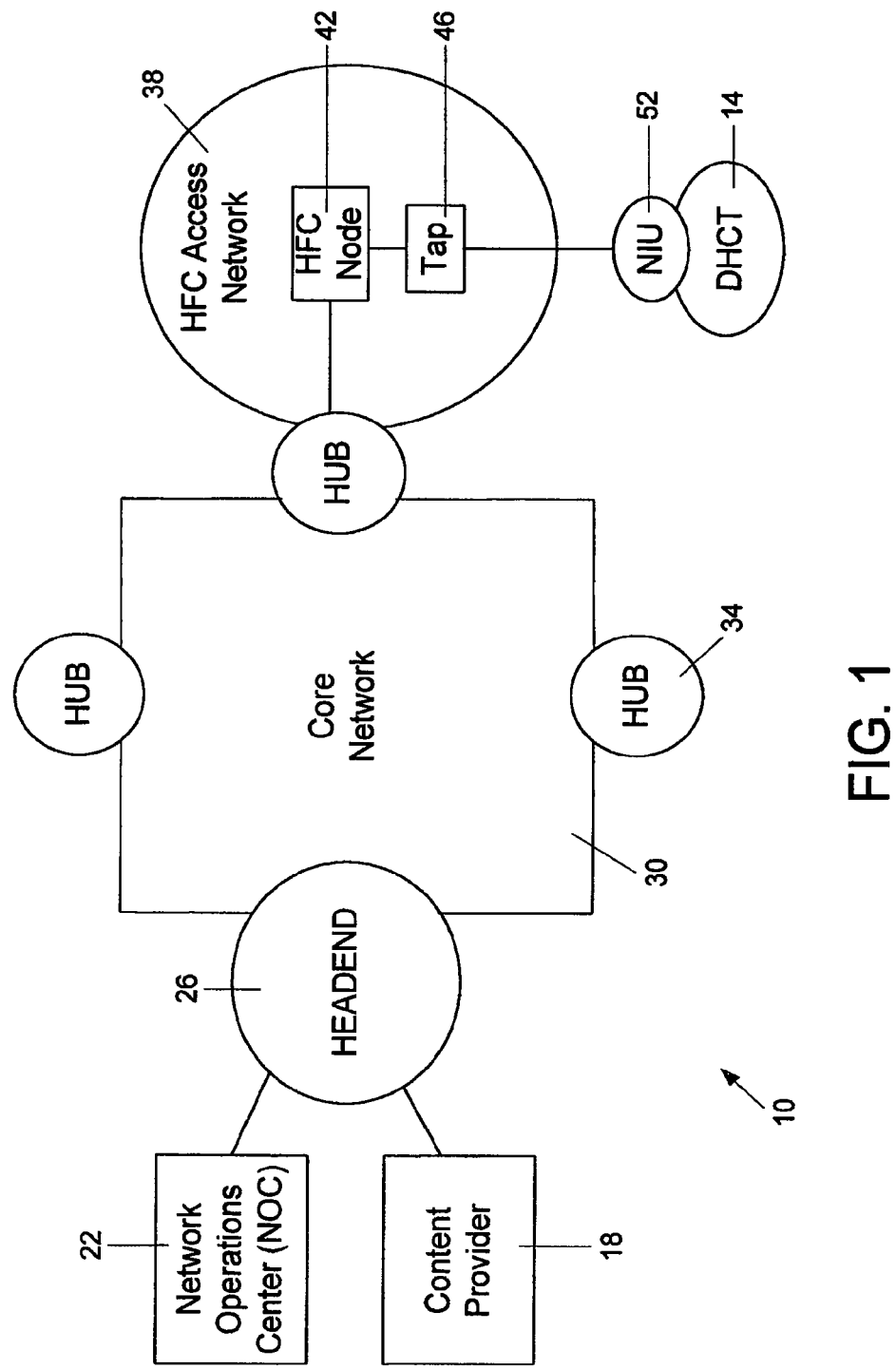

Having thus described the invention in general terms, reference will now be made to the accompanying drawings, which are not necessarily drawn to scale, and wherein:

FIG. 1 is a high-level block diagram view of a Digital Broadband Delivery System in accordance with an embodiment of the present invention.

Figure 2:
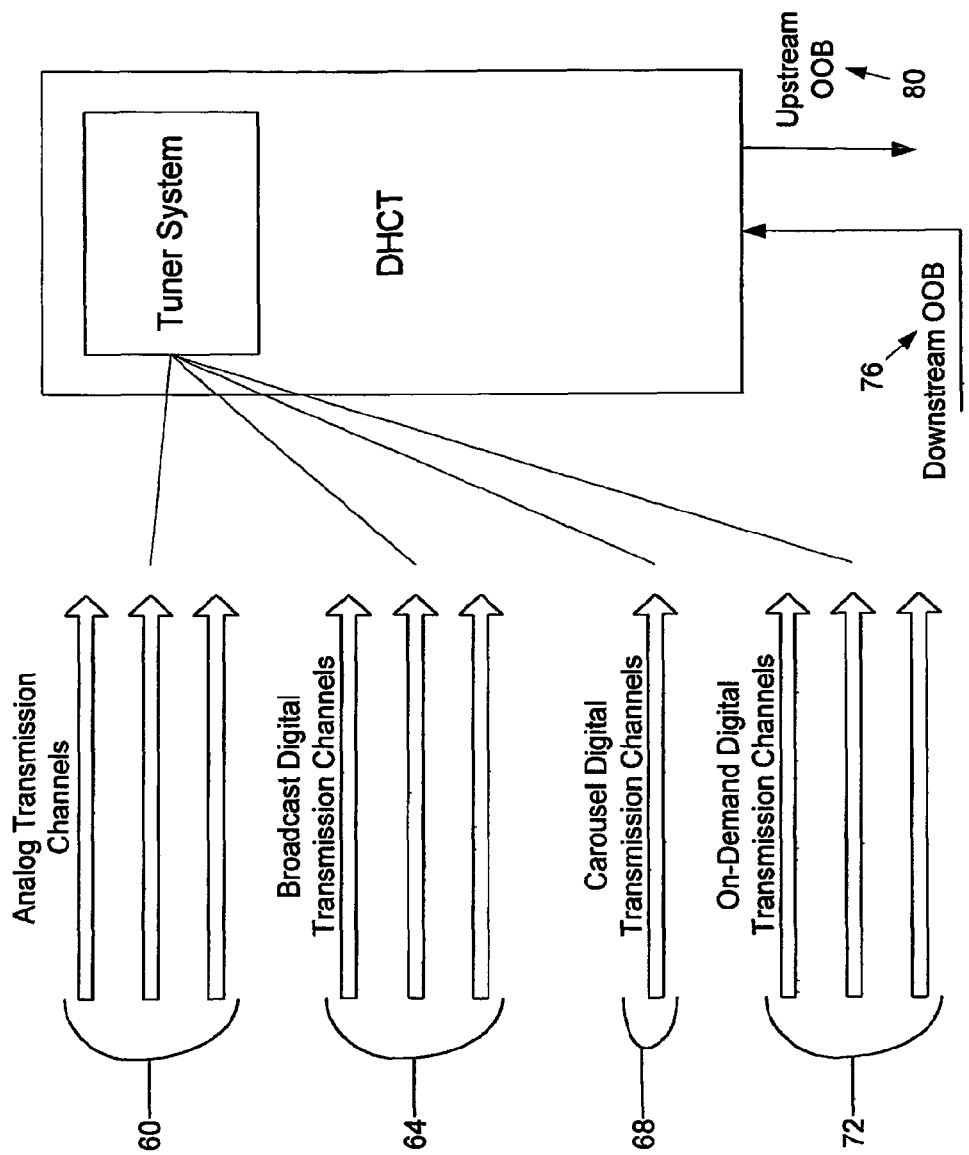

FIG. 2 illustrates the transmission channels supported by a DBDS in accordance with an embodiment of the present invention.

Figure 3:
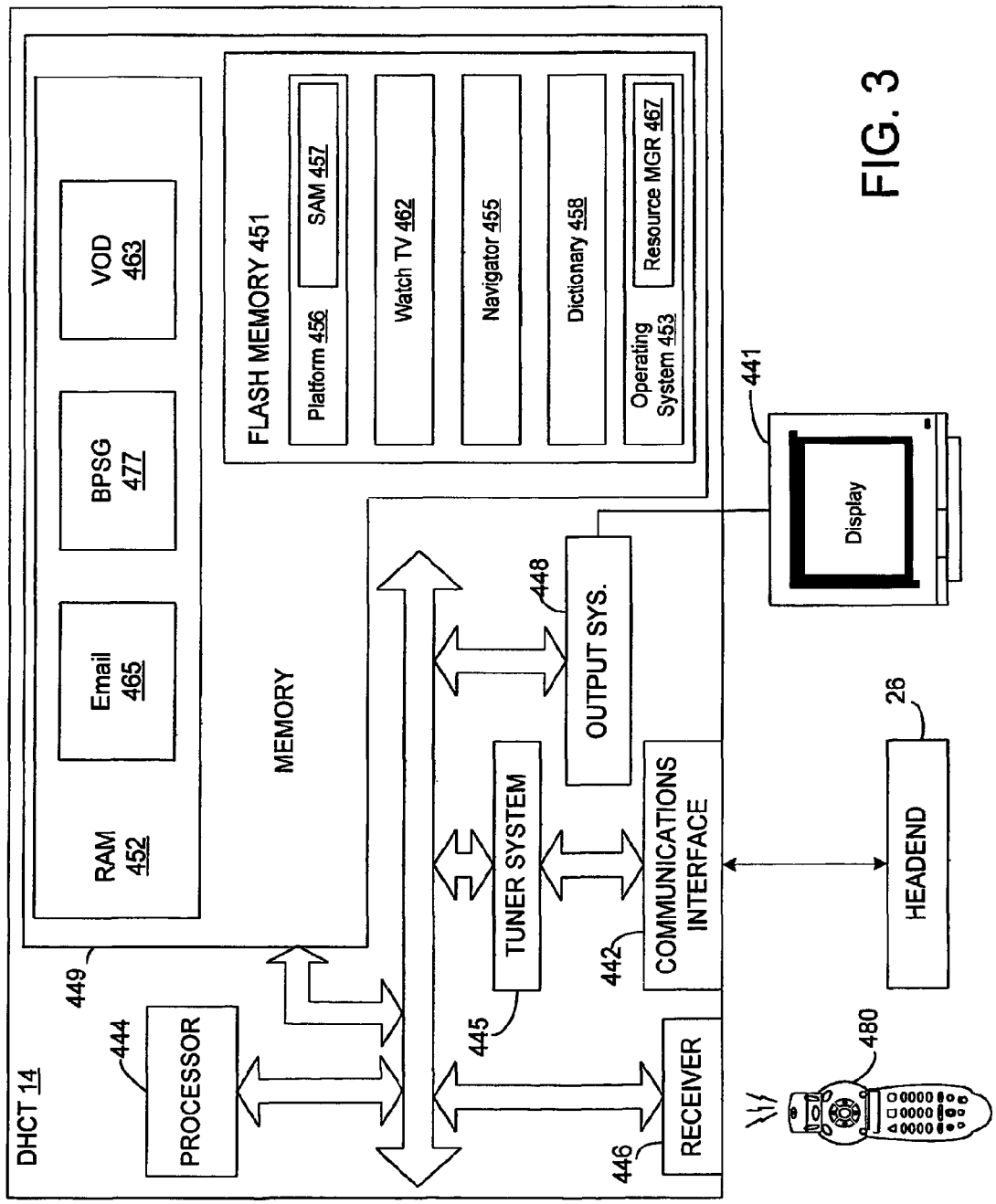

FIG. 3 is a block diagram that illustrates select components of a digital home communication terminal in accordance with an embodiment of the present invention.

Figure 4:
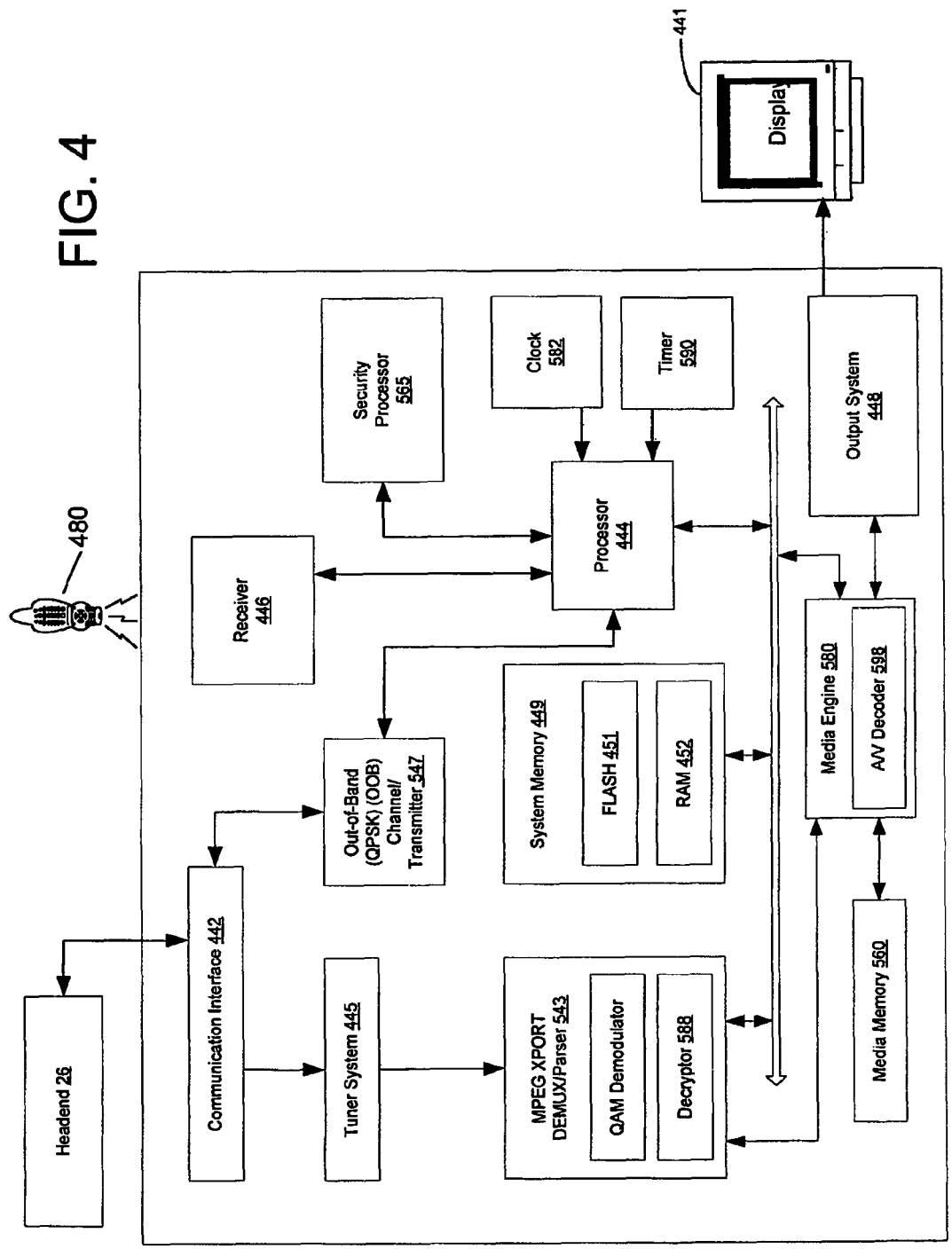

FIG. 4 is another block diagram that depicts select components of a digital home communication terminal in accordance with an embodiment of the present invention.

Figure 5:
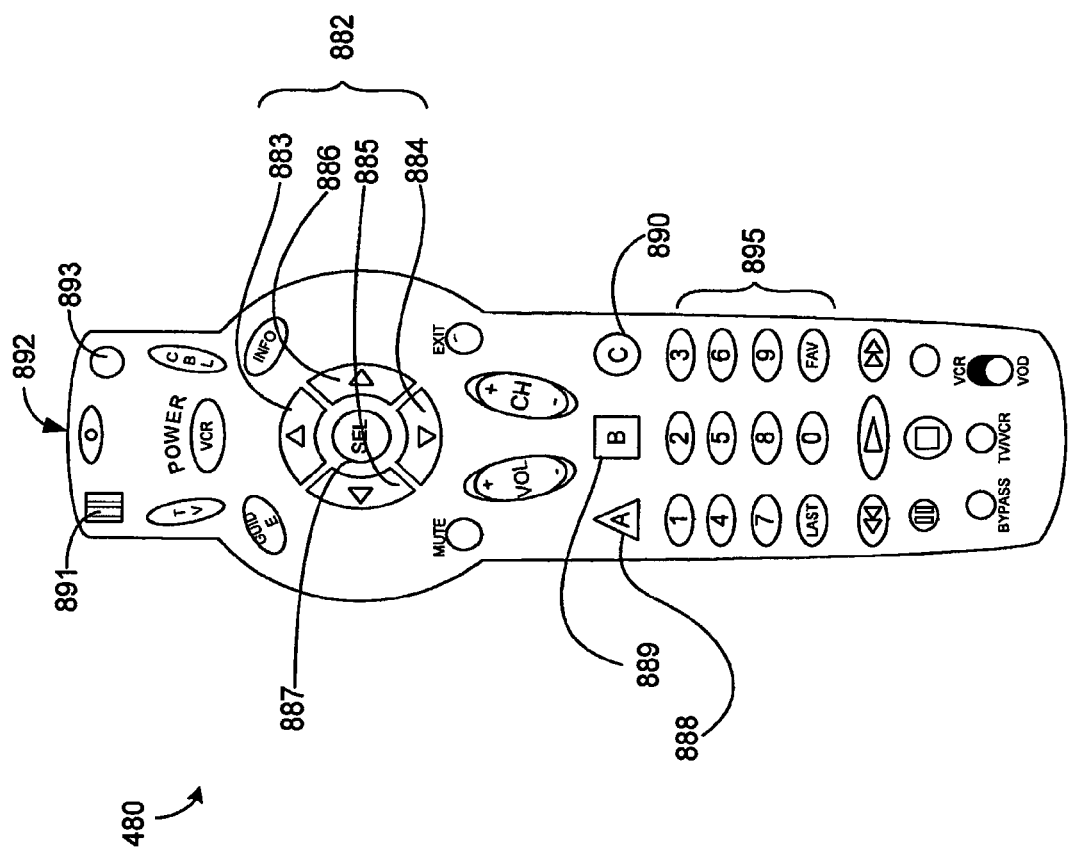

FIG. 5 illustrates a remote control device in accordance with an embodiment of the present invention.

Figure 6:
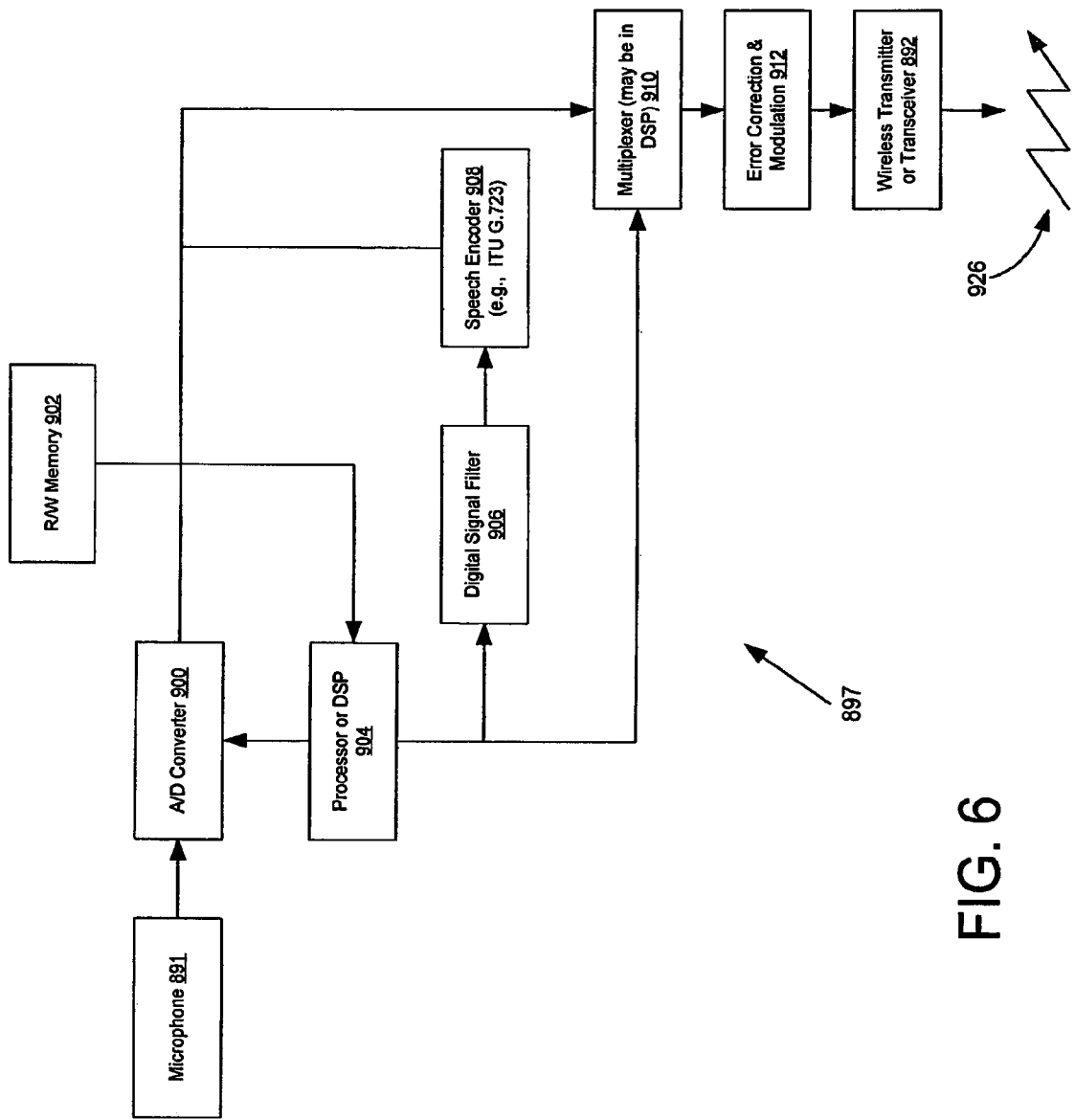

FIG. 6 is a block diagram of the digitization, encoding and transmission of speech received at the input device, according to one embodiment of the present invention.

Figure 7:
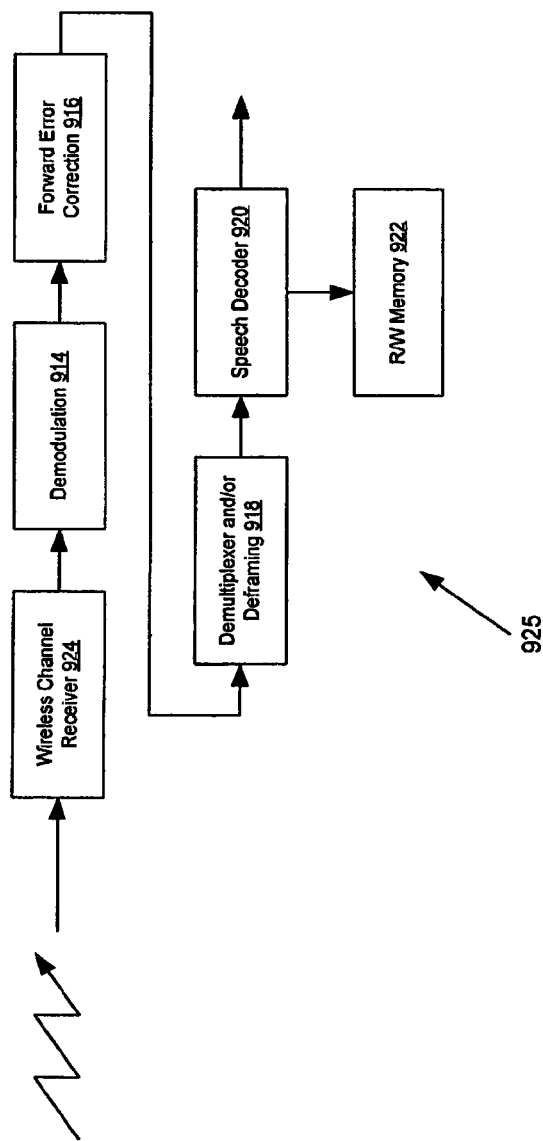

FIG. 7 is a block diagram of the reception and decoding of speech at the DHCT, according to one embodiment of the present invention.

Figure 8:
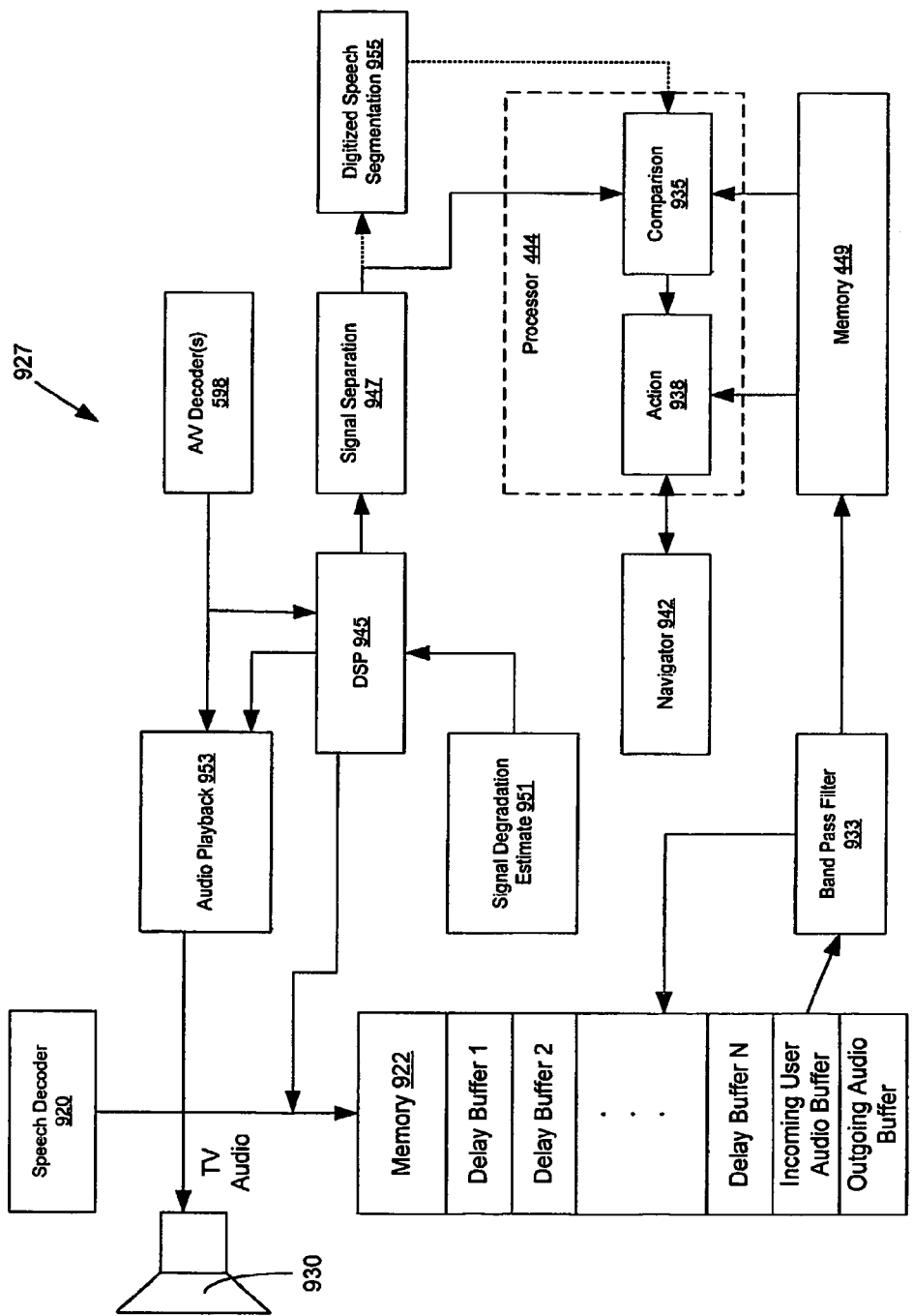

FIG. 8 is a block diagram of components comprising an audio loop that eliminate undesirable sound from the speech decoded at the DHCT, according to one embodiment of the present invention.

FIG. 9 is a flowchart of a training procedure implemented by the DHCT, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The speech recognition control apparatuses, methods and systems of the present invention are described herein with reference to a digital home communication terminal used to receive services provided from a digital broadband system. However, it should be appreciated by those of skill in the art that the apparatuses, methods and systems of the present invention may be used to in a variety of systems and components. For instance, the present invention may be used to control computers, televisions, satellite receivers, stereo equipment, remote control devices, and any other devices employing wired or wireless means of input, such as a remote control, mouse, or keyboard. Therefore, the description of the digital broadband delivery system and digital home communication terminal is intended to be an illustrative and non-limiting embodiment. First, a digital broadband delivery system (DBDS), DBDS transmission channels, and DHCT are described in detail with reference to FIG. 1-4. Thereafter a remote control device and DHCT methods and components of the present invention are described in detail with reference to FIGS. 5-8.

I. Digital Broadband Delivery System

FIG. 1 shows a block diagram view of a Digital Broadband Delivery System (DBDS) 10, including a Digital Home Communication Terminal (DHCT) 14 of the present invention. Generally, the DBDS 10 is a high quality, reliable and integrated network system that features video, audio, voice and data services to Cable TV subscribers. Although FIG. 1 depicts a high level view of a DBDS 10 including a regional HFC Access Network 38, as will be described below, it should be appreciated that a plurality of DBDSs can tie together a plurality of regional networks into an integrated global network so that Cable TV subscribers can receive content provided from anywhere in the world. The DBDS 10 delivers broadcast video signals as digitally formatted signals in addition to delivering traditional broadcast analog video signals. Furthermore, the system can support one-way broadcast services as well as both one-way data services and two-way media and data services. The two-way operation of the network allows for user interactivity with services, such as Pay-Per-View programming, Near Video-On-Demand (NVOD) programming (according to any of several known NVOD implementation methods), Video-on-Demand (VOD) programming (according to any of several known VOD implementation methods), and interactive applications, such as Internet connections and interactive services that render real-time bi-directional and multipoint communication on a personalized basis such as bi-directional audio-visual communication and videoconferencing.

The DBDS 10 also provides the interfaces, network control, transport control, session control, and servers to establish on-demand session-based bi-directional communication service between a particular remote destination and a DHCT user for delivering media from the particular remote destination to the DHCT user and input information from the DHCT user to the particular remote destination. A remote destination during a session of a bi-directional communication service may comprise a remote personal destination such as a fiend or a remote vendor that offers a bi-directional communication service for a purchasable period of time in which a viewer communicates real-time with the vendor on a personal basis. In either case, dedicated DBDS 10 resources are allocated to fulfill individualized bi-directional communication over a purchasable period.

As shown in FIG. 1, a typical DBDS 10 is composed of interfaces to Content Providers 18, Network Operations Centers (NOC) 22, core networks 30 of headends 26, hubs 34, Hybrid Fiber/Coax (HFC) Access Networks 38, and subscribers' DHCTs 14. It should be appreciated that although single components (e.g., headend 26, core network 30, HFC Access network 38, etc.) are illustrated in FIG. 1, a DBDS 10 can feature a plurality of each of the illustrated components.

The Content Provider 18 represents one or more providers of content, such as video channels, music channels, data channels, video services, audio services and data services. For example, according to one aspect of the invention, the Content Provider 18 could comprise an Electronic Program Guide (EPG) data provider which acts as a data service provider. According to another aspect of the invention, the Content Provider 18 could represent an Internet Service Provider (ISP) providing data to the system to enable subscribers web access or web-enhanced video via the subscriber's television set. The Content Provider 18 transmits the content to a headend 26 for further transmission to subscribers downstream in the network. Also in communication with the headend 26 is a Network Operation Center (NOC) 22, which is an external management center interfaced with the DBDS 10 to allow for the remote operation of the system.

Content provided by the Content Provider 18 is communicated by the Content Provider 18 to one or more headends 26. From those headends 26 the content is then communicated to the core network 30 of hubs 34 and onto a plurality of Hybrid/Fiber Coax (HFC) Access Networks (only one HFC Access Network 38 is illustrated). The HFC Access Network 38 typically comprises a plurality of HFC nodes 42, each which may service a local geographical area. The content provided from the Content Provider 18 is transmitted through the headend 26, hub 34 and HFC Access Network 38 downstream to one or more taps 46 from each one of the HFC nodes 42 of the HFC Access Network 38. The hub 34 connects to the HFC node 42 through the fiber portion of the HFC Access Network 38. Usually, the HFC node 42 connects to a subscriber's DHCT 14 through coaxial cable in a logical tree configuration, which is where the optical-to-electrical and electrical-to-optical conversions of the HFC network take place. From the HFC node 42 a coaxial drop connects the tap 46 to a Network Interface Units (NIU) 52, which is a network demarcation point physically located on the side of the subscribers' home. The NIU 52 provides a transparent interface between the HFC node 42 and the subscribers' internal wiring. Coaxial cables are preferred in this part of the system because the electrical signals can be easily repeated with RF amplifiers. Typically, six amplifiers or less are located in series between the HFC node 42 and the subscribers' DHCTs 14. As DBDSs are well known to those of skill in the art, further description of the DBDS 10 of FIG. 1 will not be contained herein.

II. DBDS Channels

FIG. 2 shows illustrative channels supported by the DBDS, where the channels 60, 64, 68, 72 and 76 are input into a DHCT 14 of the present invention. These input channels can be provided by the one or more Content Providers 18 illustrated in FIG. 1. Additionally, a few channels can be generated at a Headend 26 or at a Hub 34 functioning as a mini-Headend which possesses some Headend functionality. As depicted in FIG. 2, the DBDS 10 can simultaneously support a number of transport channel types and modulation formats. The ability to carry analog and digital signals over a large bandwidth are characteristics of a Hybrid Fiber/Coax (HFC) Network typically employed in a DBDS, as in the DBDS 10 of FIG. 1. As will be appreciated by those of skill in the art analog and digital signals in HFC networks can be multiplexed using Frequency Division Multiplexing (FDM), which enables many different types of signals to be transmitted over the DBDS 10 to the DHCT 14 of the present invention. Typically, a DBDS using HFC supports downstream (i.e., in the direction from the Headend to the DHCT) frequencies from 50 MHz to 870 MHz whereas upstream frequencies (i.e., in the direction from the DHCT to higher levels of the system) are in the 5 MHz to 42 MHz band. Generally, the RF channel bandwidth spacing for analog and digital services is 6 MHz. Furthermore, for a typical 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. It should be understood that RF channels can be assigned to carry analog video signals but the present invention is not limited to embodiments where a RF channel is assigned to carry analog video signals upon fulfillment of a complete transition of the DBDS to an all digital system.

Referring again to FIG. 2, the downstream direction channels, having been multiplexed using frequency division multiplexing (FDM), and often referred to as in-band channels, include Analog Transmission Channels (ATCs) 60 and Digital Transmission Channels (DTC) 64, 68, 72 (also known as Digital Transport Channels). These channels carry video, audio and data services. For example, these channels can carry television signals, Internet data, or any additional types of data, such as Electronic Program Guide (EPG) data. The signals and data carried on these channels are collectively referred to herein as services. The ATCs 60 shown in FIG. 2 are typically broadcast in 6 MHz channels having an analog broadcast composed of analog video and analog audio, and include Broadcast TV Systems Committee (BTSC) stereo and Secondary Audio Program (SAP) audio. Additionally, as will be appreciated by those of skill in the art, additional data, such as EPG data, can be sent with the analog video image in the Vertical Blanking Interval (VBI) of the video signal. It should be appreciated, however, that the amount of data that can be transmitted in the VBI of the analog video signal is typically significantly less than data transmitted in a DTC, as explained below.

Like the ATCs 60, the DTCs 64, 68, 72 each occupy 6 MHz of the RF spectrum. However, the DTCs 64, 68, 72 are digital channels consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTC channel types over each 6 MHz RF spacing, as compared to a 6 MHz ATC. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these Digital Transmission Channels (DTCs). However, because MPEG-2 transport stream multiplex video, audio, and data to be placed into the same stream, the DTCs do not necessarily have to be allocated in separate 6 MHz RF frequencies, unlike ATCs 60. On the other hand, each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. According to one aspect of the invention, encryption can be applied to the data stream for security so that the data, such as EPG data, may be received only by authorized DHCTs. For instance, one individual subscriber may be authorized to receive minimal set of EPG data, while others may be authorized additional incremental amounts of EPG data (for example, EPG data for future days) according to a tiered service fee and/or depending on the amount of memory in the DHCT. Therefore, additional subscribers in the same local area not authorized to receive EPG data will not.

Each 6 MHz RF spacing assigned as a digital transmission channel can carry the video and audio streams of the programs of multiple television (TV) stations, as well as media and data that is not necessarily related to those TV programs or TV channels, as compared to one TV channel broadcast over one ATC 60 that consumes the entire 6 MHz. The digital data is inserted into MPEG transport streams carried through each 6 MHz channel assigned for digital transmission, and then de-multiplexed at the subscribers' DHCT so that multiple sets of data can be produced within each tuned 6 MHz frequency span.

Continuing with FIG. 2, the broadcast DTCs 64 and carousel DTCs 68 typically function as continuous feeds for indefinite time, whereas the on-demand DTCs 72 are continuous feeds sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 carry broadcast data, such as EPG data, that is systematically broadcast in a cycling fashion but updated and revised as need be. Thus, the carousel DTCs 68 can serve to carry high volume data, such as EPG data, as well as other data at high data rates. The carousel DTCs 68 typically carry data formatted in directories and files by a Broadcast File System (BFS), which is used for producing and transmitting data streams throughout the DBDS, and which provides an efficient means for the delivery of application executables and application data to the DHCT, as disclosed by application Ser. No. 09/319,844, entitled "Using a Hierarchical File System For Indexing Data Broadcast to a Client From a Network of Servers", filed Dec. 9, 1997, assigned to Scientific Atlanta, and incorporated herein by reference. The on-demand DTCs 72, on the other hand, can carry particular information such as compressed video and audio pertaining to subscriber requested program preview and/or program descriptions, as well as other specialized data information. Although broadcast in nature, the carousel DTCs 68 and on-demand DTCs 72 offer different functionality. The User-to-Network Download Protocol of the MPEG-2 standard's DSM-CC specification (Digital Storage Media—Command and Control) provides the data carousel protocol used for broadcasting data from a server located at headend 26. It also provides the interactive download protocol for reliable downloading of data from a server (possibly the same server) to an individual DHCT through the on-demand DTCs. Each carousel and on-demand DTC is defined by a DSM-CC session.

Also shown in FIG. 2 is an Out-Of-Band (OOB) channel that provides a continuously available two-way signaling path to the subscribers' DHCT 14 regardless of which in-band channels are tuned to by the individual DHCT in-band tuners. The OOB channel consists of a Forward Data Channel (FDC) 76 and a Reverse Data Channel (RDC) 80. The OOB channel can comply to any one of a number of well known transport protocols but preferably complies to either a DAVIC 1.1 Transport Protocol with a FDC of 1.544 Mbps or more using QPSK modulation and an RDC of 1.544 Mbps or more using QPSK modulation, or to a DOCSIS Transport Protocol with a FDC of 27 Mbps using 64-QAM modulation and a RDC of 1.544 Mbps or more using QPSK modulation or 16QAM modulation. The OOB channels provide the two-way operation of the network, which allows a subscriber interactivity with the applications and services provided by the network. Therefore, functionality reflected in the DHCT 14 is similar to a networked computer (i.e., a computer without a persistent storage device), in addition to traditional set top box functionality, as is well known in the art. Furthermore, the OOB channels are not limited to a 6 MHz spectrum, but generally to a smaller spectrum, such as 1.5 or 3 MHz.

III. DHCT

A DHCT 14 is typically situated within the residence or business of a subscriber. It may be integrated into a device that has a display 441, such as a television set, or it may be a stand alone unit that couples to an external display 441, such as a display included with a computer or a television that processes media transported in television signals for presentation or playback to a subscriber (user of the DHCT 14). The DHCT 14 preferably comprises a communications interface 442 for receiving the RF signals, which can include media such as video, audio, graphical and data information, from the tap 46 and for providing any reverse information to the tap 46 for transmission back to the headend 26. The DHCT 14 further includes a processor 444, such as a central processing unit or a digital sound processor, for controlling operations of the DHCT 14, and a video output port, such as an RF output system 448, for diving the display 441. The DHCT 14 also includes a tuner system 445 for tuning to a particular television channel to be displayed and for sending and receiving data corresponding to various types of media from the headend 26. The tuner system 445 includes, in one implementation, an out-of-band tuner (OOB) for bi-directional quadrature phase shift keying (QPSK) data communication and a quadrature amplitude modulation (QAM) tuner for receiving television signals. The OOB is coupled with an upstream transmitter to enable the DHCT 14 to interface with the network so that the DHCT 14 can provide upstream data to the network, for example via the QPSK or QAM channels. This allows a subscriber to interact with the network to request data from services such as program guide data and, if necessary, encryption can be added to the OOB channels to provide privacy. Additionally, the DHCT 14 includes a receiver 446 for receiving externally generated information, such as user inputs or commands for other devices. The DHCT 14 may also include one or more wireless or wired communication interfaces, also called ports, for receiving and/or transmitting data to other devices. For instance, the DHCT 14 may feature USB (Universal Serial Bus) (for connection to a USB camera or microphone), Ethernet (for connection to a computer), IEEE-1394 (for connection to media devices in an entertainment center), serial, and/or parallel ports. The receiver 446 and/or ports receive user inputs, which may be received from buttons or keys located on the DHCT 14 or by a remote control device 480 that includes user-actuated buttons. According to one illustrative example, the DHCT 14 may feature USB or IEEE-1394 for connection of an infrared wireless remote control 480 or a wired or wireless keyboard, a camcorder with an integrated microphone, or to a video camera and a separate microphone. The methods and apparatuses by which a user communicates with the DHCT 14 is described in greater detail with respect to FIGS. 5-7.

Technology for digitizing and compressing/decompressing video and speech signals is well-known in the art. In a preferred embodiment the DHCT 14 of the present invention has the capability to simultaneously decompress and reconstruct video, audio, graphics and textual data that may, for example, correspond to a service such as an interactive program guide. This permits the DHCT 14 to store video and audio in memory in real-time, to scale down the spatial resolution of the video pictures, as necessary, and to composite and display a graphical user interface (GUI) presentation of the video with respective graphical and textual data while simultaneously playing the audio that corresponds to the video. The same process applies in reverse and the DHCT 14 can, for example, digitize and compress pictures from a camera for upstream transmission. Referring again to the DHCT 14 illustrated in FIG. 3, in one implementation, the DHCT 14 includes a memory 449 which in turn includes non-volatile memory, such as FLASH memory 451, and random access memory (RAM) 452 for storing executable programs and related data components of various applications and modules for execution by the DHCT 14. Both the flash memory 451 and the RAM memory 452 are coupled to the processor 444 for storing configuration data and operational parameters, such as commands that are recognized by the processor 444. The basic functionality of the DHCT 14 is provided by an operating system 453 that is contained in flash memory 451. One or more programmed software applications, herein referred to as applications, are executed by utilizing the computing resources in the DHCT 14. Applications stored in flash memory 451 or RAM memory 452 are executed by processor 444 under the auspices of the operating system 453. Data required as input by an application is stored in RAM 452 and read by the processor 444 from RAM 442 as needed during the course of application program execution. Input data may be data stored in RAM 452 by a secondary application or other source, either internal or external to the DHCT 14, or anticipated by the application and thus created with the application at the time it was generated as a software application program in which case it is stored in flash memory 451. Data may be received via any of the communication ports of the DHCT 14, from the headend 26 via the DHCT's network interface (i.e., the QAM or out-of-band tuners), or as user input via receiver 446. A type of input data fulfills and serves the purpose of parameters as described below. Data generated by applications is stored in RAM memory 452 by the processor 444 during the course of application execution.

The flash memory 451 also contains a platform library 456. The platform library 456 is a collection of functions useful to applications, such as a timer manager, compression manager (for compressing text, video and/or audio), database manager, string managers, and other utilities (not illustrated). As shown in FIG. 3, also included within the platform library is a Service Application Manager (SAM) 457. These utilities are accessed by applications requiring these utilities thus resulting in memory consumption savings and a consistent user interface. The Service Application Manager (SAM) 457, provides a model in which the user can access services available on the system. A service consists of an application to run and a parameter, such as data content, specific to that service. The SAM 457 handles the lifecycle of the applications on the system, including the definition, initiation, activation, suspension and deletion of services they provide and the downloading of the application into the DHCT 14 as necessary. Many services can be defined using the same application component, with different parameters. As a non-limiting example, video programming tuning application could be executed with one set of parameters to view HBO and a separate set of parameters to view CNN. Each association of the application component (tune video) and one parameter component (HBO or CNN) represent a particular service that has a unique service ID. The SAM 457 also interfaces with a resource manager 467 of the operating system 453 to control resources of the DHCT 14. Preferably, each application includes an application client that executes on the DHCT 14 and provides the application's services to the user typically through a graphical user interface. Also contained in the flash memory 451 is a navigator 455 which provides a navigation framework for the user to access services available on the cable system. Examples of the services include, in one implementation, watching television and pay-per-view events, listening to digital music, and an interactive bi-directional service program guide, each of which is controlled through separate applications in flash memory 451. The navigator 455 also allows users to access various settings of the DHCT 14, including volume, pare control and VCR commands. Moreover, the navigator 455 provides users with television related menu options that correspond to DHCT 14 functions such as interactive program guides, channel blocking and/or displaying a program purchase list.

Traditional interactive program guides (IPG), Watch TV 462, and pay-per-view (PPV) are examples of resident applications in flash memory 451. An IPG displays a program guide to the user and populates the guide with program data for selection, watch TV 462 enables a user to simply "watch television", and PPV enables viewing of premium television services. Because these applications are in flash memory 451, each remains available to the user and does not need to be downloaded each time the DHCT 14 initializes.

Applications stored in the RAM 452 may be loaded when the DHCT 14 initializes or downloaded to the DHCT 14 upon a user-initiated command using an input device such as the remote control device 480. In an illustrative example, RAM memory 452 may contain a video-on-demand application (VOD) 463, an e-mail application 465, a bi-directional services program guide client application 477 and a digital music application. Additionally, RAM memory 452 could also contain a calendar and/or a calculator application. It will be obvious to one with ordinary skill in the art that these applications are illustrative and merely serve as examples of possible embodiments of the invention.

These applications as well as others provided by a cable system operator, are top level software entities on the network for providing services to the user. In one implementation, all applications executing on the DHCT 14 work with the navigator 455 by abiding by several guidelines. For example, an application should first utilize and implement the SAM 457 for provisioning, activation, and suspension of services. Second, an application should share DHCT 14 resources with other applications and abide by the resource management policies of the SAM 457, the operating system 453, and the DHCT 14. Third, an application should handle all situations where resources are unavailable without navigator 455 intervention. Fourth, when an application loses service authorization while providing a service, an application should suspend the service gracefully. The navigator 455 will reactivate an individual service application when it later becomes authorized. Finally, an application should be configured so it does not respond to input commands reserved for the navigator. For instance, as a non-limiting example, when user input commands are entered via a wireless remote control device 480 or keyboard, the application may be configured so it does not have access to certain user input keys that are reserved by the navigator 455 (i.e., power, channel +/−, volume+/−, etc.). Without limitation to the foregoing, in some circumstances certain applications during the course of program execution may reach a machine-state in which input keys that would ordinarily be reserved may be employed for input by the application but only during that particular machine-state. For instance, an application may display a user interface that specifically requests input or selection from the user in which one or more of the reserved keys are used momentarily during that machine-state.

FIG. 4 is another depiction of selected elements of the DHCT 14 including some of the elements previously discussed. The DHCT 14 includes a tuner system 445 that can select one of a plurality of transmission channels provided from a headend 26, such as occurs in, for a non-limiting example, a digital cable TV network or a DBDS. The tuner system 445 enables the DHCT 14 to tune to downstream media and data transmissions, thereby allowing a user to receive digital video, audio and data content associated with a program or a bi-directional communication service content transmitted via the subscriber network television system. As in the DHCT 14 of FIG. 3, the tuner system 445 receives transmissions via the communication interface 442. Also connected to the communications interface 442 are an out of band (OOB) tuner and upstream transmitter 547. It should be appreciated that although the OOB tuner and upstream transmitter 547 are illustrated as one component in FIG. 4, the tuner and transmitter can be independent of each other and located separately within the DHCT 14. Nonetheless, both components are in communication with the subscriber network television system so that upstream transmissions can be received by the system to effect bi-directional communication. The OOB tuner and upstream transmitter 547 enable the DHCT 14 to interface with a subscriber network television system so that the DHCT 14 can provide upstream data to the network, for example, via a QPSK channel that serves as an upstream OOB channel (see FIG. 2) and received by a QPSK receiver in QPSK modem 326 in headend 26.

Alternatively, upstream data transmission can be effected via a QAM channel with a QAM transmitter (not illustrated) in DHCT 14 and a QAM receiver in headend 26. According to yet another alternative embodiment, a telephone modem (not shown) can be located in the DHCT 14 and utilized for upstream data transmission, and a headend 26 or hub 12 or other component located upstream in the subscriber network television system may receive data from a telephone network coupled to a telephone modem and can route the upstream data to a destination internal or external to the subscriber network television system.

The DHCT 14 includes a demultiplexing system 543 comprising functionality for QAM demodulation, forward error correction (FEC), transport demultiplexing, decryption, and parsing, as is well known in the art, to counter the effect of signal processing of broadcast media and data in the subscriber network television system. Transport demultiplexing preferably includes MPEG-2 transport demultiplexing. The demultiplexing system 543 is in communication with communication interface 442, tuner system 445 and processor 444 and effects reception of compressed video streams, compressed audio streams, and compressed data streams corresponding to a selected or requested service to be separated from other programs and/or streams transported in the tuned transmission channel and to be presented to the subscriber. The DHCT 14 also includes a media engine 580 configured with elements for driving the display 441, in cooperation with output system 448, and the media engine 580 also includes decoding circuitry 598 to decode compressed digital video, digital channel audio, digital data and analog channel audio.

The DHCT 14 shown in FIG. 4 further includes a security processor 565, which is a secure element for performing security and conditional access related functions. More particularly, the security processor 565 functions to authorize a paying subscriber's DHCT 14 to execute specialized functionality of the DHCT 14, such as receiving and decrypting (or descrambling) encrypted (or scrambled) media and other data sent from a remote device. The security processor 565 preferably includes a microprocessor, and a memory that only the microprocessor of the security processor 565 may access. Preferably, the security processor 565 is contained in a tamper proof package. Additionally, according to one preferred embodiment, the security processor 565 stores authorization information that indicate the rights of a subscriber to access a particular session's streams. Subscriber authorization information is obtained from one or more entitlement messages sent by the head end 26 after, or concurrently with, initialization of the DHCT 14 into a purchased service. If the authorization information indicates that the subscriber is entitled to the session's streams, the security processor 565 generates a code word or key based on the authorization information and the received entitlement control message, and the security processor 565 uses this key to decrypt the encrypted session's streams at the decryptor 588.

The DHCT 14 also includes a clock 582 and timers 590 that enable computation of the time relationship between its internal clock and the clock specified by the received session's streams. By reading and interpreting the clock and time stamps specifications intrinsic in the session's streams (for example, as provisioned in MPEG-2), or as communicated by the head end 26 via the out of band pathway or channel, the DHCT 14 can effect an output for the media and/or information received from the remote location as a synchronized presentation to the user that includes reconstructed video pictures, the reconstructed digital audio samples, and supplementary information that emanated from the remote location.

As noted above, under the auspices of the real-time operating system 453 (FIG. 3) executed by processor 444, packets corresponding to the session's media streams and/or data are received in DHCT 14 via communications interface 442 and stored in a temporary buffer in memory 449. The temporary buffer is implemented and managed as a circular buffer to enable data transfers from the temporary buffer to the media memory 560 in concert with the insertion of newly arriving packets into the temporary buffer. Packets are read from the temporary buffer in memory 449 and written to media memory 560 in a sufficiently fast manner. Orchestration of multiple simultaneous data transfer operations is effected so that while packets are being transferred from memory 449 to media memory 560, new packets are received and stored in the temporary buffer.

IV. Remote Control Device

FIG. 5 illustrates a non-limiting example of a remote control device that is used to provide user input to the DHCT 14. Although the remote control device is described herein with respect to the DHCT 14 discussed above, the remote control device and speech recognition system of the present invention may be used in conjunction with a television, audio equipment, computers, or other electronics that the user may wish to remotely control. Additionally, although FIG. 5 is directed to a remote control similar in external appearance to conventional remote controls, the remote control device of the present invention may comprise a computer keyboard, handheld controller, pressure-sensitive pad, mouse, or similar input device used to control a computer, television, or other electronic device. According to another embodiment of the present invention the remote control device can comprise a number of distributed elements, such as microphones, that are located throughout a room or house to provide widely supported remote control functions.

As illustrated in FIG. 5, the remote control device 480 includes arrow buttons 882; specifically, an up arrow button 883, a down arrow button 884, a left arrow button 885, and a right arrow button 886 are used to scroll through options or selections and/or to highlight an option or selection displayed on one of a plurality of user interface screens. The select button 887 may be used to select a currently highlighted option or selection that is provided to the user. Lettered buttons "A" 888, "B" 889, and "C" 890 may also be used to implement functions on a user interface screen that have the corresponding letter. Additionally, the remote control device 480 includes numeric buttons 895 that are used to enter numbers, or configured to enter letters corresponding to the numeric buttons 895. In describing the example screen displays, it will be understood that "selecting" or "pressing" the navigational and lettered buttons on the screen actually require selecting the corresponding remote control device 480 buttons.

The remote control device 480 also includes at least one microphone 891 for receiving speech and sounds, such as voice-activated controls. Additionally, the remote control device 480 may include one or more switches or buttons (not illustrated) associated with the microphone 891 that allow the user to turn the microphone on or off, or to adjust the sensitivity of the microphone, as is common in conventional microcassette voice recorders. It will be appreciated that it is advantageous that the microphone sensitivity be set relatively low such that ambient noise from sources other than the user (e.g., television sound) does not significantly impact the voice controls received from the user. Additionally, a second microphone acting as a noise-canceling microphone in the remote control device 480 can provide some attenuation of ambient noise while transducing the desired voice commands. Such microphones are commonly used in consumer electronic devices such as lightweight telephone headsets, cell phones, and computer microphone accessories. The microphone 891 allows a user to send voice-activated commands to the DHCT to control navigation through menus without requiring to enter a sequence of one or more key strokes or button depressions on the remote control device 480. For instance, a user may select a program guide or particular television channel by simply saying "Program Guide" or "Channel 160" into the microphone 891.

Controlling the DHCT 14 via voice-activated commands simplifies the process of entering input for certain commands that would typically require navigation through a maze of interactive menus presented to the user. A single voice-activated command spoken by user into microphone 891 can effect the DHCT 14 to enter a machine-state that would ordinarily require a sequence of a plurality of key presses through the navigation of a sequence of one or more menus presented in the graphical user interface (GUI) on the display 441. As explained below, the user can customize voice-activated commands through a set-up training procedure in which voice-activated commands are associated with a specific command or with a specific sequence of commands. Conveniently, a user speaking into microphone 891 in the remote control device 480 can do so without unnecessarily having to look and search on remote control device 480 for the appropriate key to press.

According to one embodiment of the invention, remote control device 480 has a dedicated enable microphone button or key 893, that is required to be pressed by the user during the complete duration of time that the user is entering voice-activated commands via microphone 891. Upon release of the enable microphone key 893, the digital signal processing capability of the remote control device 480 is disabled or deactivated. Alternatively, the enable microphone key 893 can also be a switch that is required to be pushed or set to an enable position. In yet another embodiment, the enable microphone button 893 can operate as a functional toggle that activates or deactivates the microphone each time it is pressed. The microphone may also be used in conjunction with one or more speakers on the remote (not illustrated), DHCT, or device to which the DCHT is in communication with, such that the user may be prompted to speak into the remote. For instance, a user may be instructed to speak via a graphical user interface. Furthermore, the microphone 891 may be used by the user in conjunction with one or more buttons on the remote control device 480, such that a combination of speech and buttons is used to transmit controls to the DCHT or receiving device. Many alternative methods of providing user input may be used including a remote control device with different buttons and/or button layouts, a keyboard device similarly with one or more microphones, a voice activated device, etc. The remote control also includes a wireless transmitter 892 and/or transceiver transmitting control signals to the DHCT. The transmitter 892 may be a radio frequency (RF) or infrared transmitter (IR), as are well known in the art.

FIG. 6 shows a block diagram flow chart 897 illustrating the method and components by which the remote control device 480 receives, digitizes, encodes and transmits speech controls. To perform these processes the remote control device 480 hardware and/or software generally includes a microphone 891, speech digitizing circuitry 900, components 904, 906, 908 to effect speech encoding on a digitized speech signal, and a wireless transmitter 892. Referring now to FIG. 6, speech received at the microphone 891 is forwarded to an analog to speech digital (A/D) converter 900 where it is digitized. The digital speech signal is then forwarded to a DSP processor 904, which is a processor designed to perform signal-manipulation calculations at high speed, such as digital signal filtering, as is well known to those of skill in the art. The DSP 904 features an architecture comprising of on-chip integration of various subcomponents and dedicated data paths between some of the subcomponents for efficiency in computation. Instruction set in the DSP 904 allows software programs to exercise the functionality of subcomponents in the DSP 904 in a number of possible ways. Multiple subcomponents may be exercised in parallel or in a specific sequence to obtain high performance for a respective desired computation. Furthermore, the DSP 904 is typically designed with its instruction set tailored to exercise its subcomponents for high performance execution of numerical intensive operations as required for digital signal processing. In one embodiment DSP 904 may be a general-purpose microprocessor controlled by software or firmware, and/or a programmable logic array, and/or an application-specific integrated circuit with special-purpose hardware logic for performing special computations typical of digital signal processing.

Also illustrated in FIG. 6 is a digital speech filter 906. The digital speech filtering 906 may be a separate circuit working in communication with DSP processor 904 or a task implemented in one or more of the subcomponents of DSP 904 as an executable program. The function of digital speech filter 906 relies in one embodiment, on the storage of digitized speech samples. The R/W Memory 902 serves as a repository for input and output of data between the components or subcomponents of remote control device 480. For instance, digitized speech samples output by A/D converter 900 may be stored in a section of memory 902 allocated as a buffer to be used as input data by DSP 904. Hence, memory 902 can also be used to store audio data awaiting processing, to store intermediate results and internal state information during computations, and to queue output data. Thereafter, the digitized speech signals are forwarded to the digital speech filter 906, which reduces the ambient noise received by the microphone 891. In one embodiment of the present invention the digital speech filter 906 is a band pass filter BPF). When a second microphone (not shown) in the remote control device 480 is employed to assist in noise-cancellation, the digital speech filter 906 employs digitized audio samples provided by A/D converter 900 and a second A/D converter (not shown) that digitizes input from second microphone. It should also be appreciated by those of ordinary skill in the art that the digital speech filter 906 can also be implemented with software and/or hardware in the DSP 904.

In an alternate embodiment, digital speech filter 906 effects filtering for retention of the band-pass of the radio frequency (RF) spectrum corresponding to a human's speech signal, accentuating the filtering out of spectra where human speech is not found. The resulting filtered signal is then encoded by speech encoder engine 908 as explained above. In yet another embodiment, digital speech filter 906 functions as a filter to filter in spectrum corresponding to a human's speech signal and to filter out ambient noise.

After filtering is performed by the digital speech filter 906, the digital speech signals are received at a speech encoder engine 908 which implements compression of the digitized speech samples presented at its input and outputs a compressed digitized speech stream in compliance to a specified method or algorithm, such as an International Telecommunications Union (ITU) standard G.723 ("Dual rate speech codec for multimedia communications transmitting at 6.3 or 5.3 kbit/s"). In one embodiment the DSP 902 may perform the compression of the digitized speech signal in part or in full or in cooperation and communication with speech encoder engine 908. The speech encoder engine 908 may further perform in full or in part packetization of the compressed stream as well as include synchronization information in the packetized stream, as need be, in compliance to a designated format and/or protocol. Alternatively, the DSP 904 may perform packetization of the compressed stream produced by speech encoder engine 908 as well as include synchronization information, solely or in part in communication with speech encoder engine 908. Referring again to FIG. 6, a wireless transmitter 892 in the remote control device 480 includes a transmission antenna and effects transmission of information intended for reception by a receiver in the DHCT 14 over a wireless channel 926. The wireless transmitter 892 and receiver communicate by fulfillment of a communication protocol stack. As a non-limiting example, a communication protocol stack includes in order from bottom to top: a physical layer, a link layer, a network layer, a data transport layer, a control protocol layer, a framing and packet layer, a speech encoding/decoding layer and a presentation layer. Order from bottom to top is typically associated with the sequence of layers at the receiver. Without limiting any aspect of the invention, layers can be in a different order in the stack hierarchy. It is also possible for some layers to overlap with each other in the stack hierarchy, for a layer to contain or subsume another, or for a layer to be in parallel to one or more layers in the stack hierarchy. As a whole, the communication protocol stack at the receiver fulfills operations in reverse order of the operations performed in transmission to counter the effect of the processing performed in transmission. As a non-limiting example, the receiver includes provisions for parsing (or depacketization), reassembly of packets and reconstruction of frames to present a compressed digital speech stream as will be described below.

According to one aspect of the invention, a set of control commands is provisioned by the fulfillment of the communication protocol stack during transmission and reception for effective and reliable communication. In FIG. 6, control commands are generated under execution of software programs in DSP 904. Control commands may comprise of messages encoded into a control stream, also generated by the DSP 904, and multiplexed with compressed stream produced by the speech encoder engine 908 into a data transport stream in the multiplexer 910, thus fulfilling the data transport layer and control protocol layer, respectively or combined. In one embodiment, the multiplexer 910 may be implemented in full by DSP 904. In another embodiment, multiplexing of the compressed stream and control stream into a data transport stream may be performed in part by DSP 904 in communication with multiplexer 910. Transport stream output by the multiplexer 910 undergoes addition of information for error correction and modulation 912 to be transmitted by wireless transmitter 892. Thus error correction and modulation 912 and transmitter 892 fulfill the physical layer.

Some of the control commands perform handshaking during a set-up or initialization stage or on a periodic basis to support sustenance of communication. As a non-limiting example, additional control commands transmitted in the control stream include: start, stop, standby and no active-speech frame. The start and stop commands serve as indicators to demarcate a voice-activated command spoken by the user into microphone 891 while depressing the enable microphone button, key or switch 893. The standby command transmitted by transmitter 892 serves to indicate to the receiver 924 during regular operation that there is no active speech transmission. Hence, during standby periods the transmitted transport stream comprises of a control stream without a compressed speech stream and thus the speech encoder 908 is not active. The standby command explicitly identifies that enable microphone button 893 is not depressed. In an alternate embodiment, standby command is only transmitted if the enable microphone button 893 is not depressed for a period of time longer than a predetermined threshold programmed into DSP 904 in communication with memory 902.

The "no active-speech frame" command is transmitted while the user holds down enable microphone button 893 during gaps between spoken words by user. It simplifies segmentation operation in the audio decoding loop, as explained below. Furthermore, it advantageously reduces processing of information while the transmitter and receiver are engaged in active communication. The no active-speech frame command is generated by DSP 904 by detecting the energy of audio samples output by A/D converter 900 preferably after BPF filer 906 performs filtering to retain the band-pass of the radio frequency (RF) spectrum corresponding to a human's speech signal. When the user is not speaking into microphone 891, the output produced by digital speech filter 906 will exhibit a significantly reduction or absence of energy. DSP 904 monitors and detects such condition and outputs a corresponding "no active-speech frame" for the period corresponding to the absence of speech. For instance, as a non-limiting example, the DSP 904 may detect when the amplitude (or value) of each sample in a contiguous sequence of filtered audio samples produced by the digital speech filter 906 is below a threshold value. Thus if a plurality contiguous audio samples is greater than a certain threshold, threshold 2, and each of the samples have amplitude less than threshold 1, a no active-speech frame command is generated with start time corresponding to the first sample in the sequence of samples. The no active-speech frame is terminated upon the detection of an audio sample with amplitude over threshold 2. Speech encoder 908 does not encode nor produce an encoded speech stream throughout the duration of a "no active-speech frame" control command.

According to one embodiment of the invention, wireless communication between the remote control device 480 and the DHCT is in accordance with IEEE 802.11b, and the remote control is assigned an internet protocol (IP) address by or through DHCT 14 under the auspices of the network to which DHCT 14 is connected. Thus, where the DHCT is part of a cable television network, the remote control device 480 may be assigned an IP address by or through DHCT 14 under the auspices of the Cable Television Network illustrated in FIG. 1. Referring again to FIG. 6, after the digital speech signal is multiplexed by a multiplexer 910, error correction and modulation is performed by an error corrector and modulator 912, as is known to those of skill in the art. Finally, the digital speech signals are transmitted 926 from the remote control device 480 using a wireless transmitter or transceiver 892.

Outputs presented in FIG. 6 at corresponding next-stage inputs of the processing pipeline may be connected via accessible localized memory (not shown) in which the outputting device stores the output data and the inputting device thereafter inputs the output data written to memory by the respective outputting device. Outputting and inputting devices include A/D converter 900, DSP 902, digital signal filter 906, speech encoder engine 908, and components or subcomponents thereof. Furthermore, it will be understood by those having ordinary skill in the art that components can be spatially located in different areas of transmission pipeline 897 or remote control device 480.

FIG. 7 is a block diagram depicting wireless channel receiver and processing 925 in the DHCT 14 receiver to effect the reception and decoding of speech signals transmitted over a wireless channel, according to one embodiment of the present invention. In an alternate embodiment of the invention, the receiver serves as an infrared signal receiver and wireless channel receiver and processing 925 is performed by a separate entity in DHCT 14. As illustrated in FIG. 7, the digital speech signals transmitted 926 over a wireless channel from the remote control device 480 are received at a wireless channel receiver 924 within the DHCT 14. The wireless channel receiver 924 includes a receiver antenna. As a non-limiting example of processing, received digital speech signals undergo demodulation and forward error correction performed by a demodulator 914 and forward error corrector 916, respectively. Thereafter, the digital signal is demultiplexed and/or deframed by a demultiplexer 918, and decoded by a speech decoder 920. Pursuant to a set-up or initialization stage and a start control command, speech decoder 920 becomes enabled to start decoding compressed speech streams. To effect decoding, the bitstream corresponding to the encoded speech signal is buffered in a read/write memory, such as media memory 560, according to buffering requirements for the required bit rate of bitstream, such as provided by the G.723 standard, so that the speech can be decoded by a specific decoder, such as a G.723 speech decoder 920. Speech decoder 920 outputs the decompressed and reconstructed speech signal as a sequence of digital samples that is then stored within read/write (R/W) memory 922.

In an alternate embodiment (R/W) memory 922 may be a portion of RAM 452 in system memory 449 or in media memory 560. In yet another embodiment, (R/W) memory 922 may be a separate memory, distinct from media memory 560 and RAM 452, and localized within the wireless channel receiver. However, the memory is preferably included within system memory 449 in the DHCT 14. It should be appreciated that, but for the memory 922 as aforementioned, the speech reception components within the DHCT 14 described immediately are preferably located within the receiver 446 component of the DHCT 14 illustrated in FIG. 4 However, it should also be appreciated that all of the components illustrated in FIG. 7 may be distributed throughout the DHCT 14, such as in the Demultiplexer/Parser 543, processor 444, media engine 580, and the like.

FIG. 8 is a block diagram of components comprising an audio processing loop 927, according to one embodiment of the present invention. The components eliminate undesirable sound from the speech decoded at the DHCT 14. Like the components of FIG. 7, each of the components are located within one or more components of the DHCT 14, but for the speaker 930, which can represent a speaker associated with an electronic component within control of the DHCT 14.

As illustrated in FIG. 8, after the received speech is decoded by speech decoder 920, the decoded speech streams are deposited into a section of memory 922 designated as a first buffer, which is a circular buffer for storing audio. Although illustrated as separate from the DHCT memory 449 or media memory 560 in FIG. 8, it should be appreciated that two of the memory elements may be the same, such that memory 922 is wholly contained within memory 449 or media memory 560, or that the three memories may be a single physical memory. As previously described, the speech decoder 920 produces decoded speech in response to encoded speech streams arriving through the DHCT 14 receiver 924. Decoded speech streams may include ambient noise or background audio signals that may have been picked up by microphone 891. A timed television channel's program audio is a potential source for background audio.

According to one embodiment, the stored speech streams are passed through a band pass filter 933 to pass the human speech part of the RF spectrum while minimizing, to the greatest extent possible, unwanted past program audio picked up by the subscriber's microphone 891. Filtering implemented by band pass filter 933 preferably exercises filtering parameters in accordance of knowledge of filtering parameters employed in band pass filter 906 in remote control device 480 to fulfill a complementary overall optimized filtering operation. Knowledge of filtering performed by band pass filter 906 in remote control device 480 also avoids excessive filtering that could potentially degrade the desired digitized speech signal. The filtered digital speech streams are then stored in memory 949 such that they can be processed in the next stage in the audio processing loop 927. It will be appreciated that although the band pass filter 933 is included in the audio processing loop 927 illustrated in FIG. 8, it may be a separate circuit working in communication with DSP processor 945 or a task implemented in one or more of the subcomponents of DSP 945 as an executable program.

Generally, to eliminate undesirable sound from the decoded speech, a second audio buffer is maintained in the DHCT's memory 922 that retains the audio signal corresponding to a tuned television channel's program audio played by the DHCT 14 in the immediate past. The second audio buffer is hereafter referred to as the outgoing audio buffer. According to one aspect of the invention, the outgoing audio buffer retains audio samples occurring a few milliseconds in the immediate past. However, this time is adjustable under program control, and thus, the amount of memory required for outgoing audio buffer may increase in relation to the length of time audio samples are retained for the played program audio.

For pragmatic reasons, the amount of memory allocated for the outgoing audio buffer and the incoming audio buffer are fixed respectively to a size larger than the expected worst-case consumption. The worst case consumption size for each is determined according to a number of factors, including the longest voice activation command expected by a user and the processing throughput capabilities in audio processing loop 927. The longest voice activation command expected as input from a user is determined during the training or set-up procedure explained in detail below. During the training or set-up procedure, conducted a priori, the user trains the DHCT 14 to recognize user's speech and associate voice commands with one or more desired actions.

Similar to the incoming audio buffer, the outgoing audio buffer is preferably a revolving or circular buffer retaining an amount of program audio signal equal to an interval of time from the present to an extent of the immediate past, such that the buffer retains a time interval's worth of past program audio samples. An example of a circular buffer is the Delay Buffer 1 in the memory 922 of FIG. 8. After the outgoing audio buffer is populated with initial samples, the program audio signal from the tuned channel stored in the outgoing audio buffer in the DHCT 14 is separated from the decoded and filtered speech signal. This is similar to the manner by which background noise may be subtracted or separated from a sequence of digitized audio samples by employing digital filtering techniques. Furthermore, the filtering techniques retain the bandpass corresponding to the speech signal, accentuating the filtering out or discard of spectra where human speech is not found. The resulting filtered signal may undergo additional processing in the DSP 945 to separate remnants of the played tuned audio program.

Audio corresponding to the played tuned channel may be picked up by microphone 891 as part of or mixed in with the intended speech input by a subscriber wishing to control DHCT 14 with speech commands. For purposes of separation from a received speech signal to be machine-interpreted to effect control of the DHCT 14 from audio corresponding to the played tuned channel in the past that infiltrated input to the microphone 891, the buffered samples of program audio signal equal to an interval of time from the present to the immediate past. In one embodiment, the procedure of separation of the audio signal corresponding to the played tuned channel in the past is performed for a plurality of different offsets corresponding to small time shifts to obtain a respective set of distinct background-audio-separated speech signals. Each background-audio-separated speech signal is obtained by employing a respective time-shifted delay buffer. As a non-limiting example of the respective time-shifted delay buffers, FIG. 8 depicts outgoing audio buffer as Delay Buffer 1, Delay Buffer 2, to Delay Buffer "n" in part of memory 922. The sequence of Delay Buffers may actually overlap to make effective use of memory 922 and to avoid redundant storage of common audio samples among the delay buffers. Therefore, the set of Delay Buffers is preferably implemented as one contiguous circular buffer and each Delay Buffer is accessible with a start pointer and an end pointer that effectively demarcate a respective time-shift.

As a non-limiting example, a circular buffer comprising overlapping Delay Buffers may be implemented by storing data in a designated section of memory 922 spanning consecutive memory locations that are addressable with contiguous increasing addresses. While accessing the contiguous circular buffer, if the highest addressable location of memory is reached, the subsequent memory access is performed at the first memory location of the section of memory 922 designated to the circular buffer. A time-shift, or a delay in start time, from a second Delay Buffer relative to a first Delay Buffer is performed by assigning a memory address, or pointer, to the start of second Delay Buffer that supersedes the memory address that demarcates the start Delay Buffer within the circular buffer concept.

Continuing with the components of the audio processing loop 927, the DSP 945 features an architecture comprising of on-chip integration of various subcomponents and dedicated data paths between some of the subcomponents for efficiency in computation. An instruction set within the DSP 945 allows software programs to exercise the functionality of subcomponents in DSP 945 in a number of possible ways. Multiple subcomponents may be exercised in parallel or in a specific sequence to obtain high performance for a respective desired computation. Furthermore, the DSP 945 is preferably designed with its instruction set tailored to exercise its subcomponents for high performance execution of numerical intensive operations as required for digital signal processing. In one embodiment, the DSP 945 may be a general-purpose microprocessor controlled by software or firmware, and/or a programmable logic array, and/or an application-specific integrated circuit with special-purpose hardware logic for performing special computations typical of digital signal processing.

The R/W Memory 922 serves as a repository for input and output of data between the components or subcomponents of audio processing loop 927. For instance, digitized speech samples output by bandpass filter 933 are stored in memory 922 and thereafter input to a signal separator 947. The memory 922 can also be used to store audio data awaiting processing, to store intermediate results and internal state information during computations, and to queue output data. The signal separator 947 element may be a separate circuit working in communication with DSP processor 945 or a task implemented in one or more of the subcomponents of DSP 945 as an executable program. Signal separation 947 and/or DSP 945 effect separation of one or more time-shifted versions of the past program audio signal stored in outgoing audio buffer in memory 922 from the decoded speech signal stored in incoming audio buffer in memory 922. All time-shifted versions of the past program audio signal can be caused to be separated from the decoded speech signal. Each modified signal in the set of separated signals is stored in memory 922 and considered as an input candidate containing a user command. Each input candidate is considered to find the best match in a dictionary of set of commands stored within the memory 949 in DHCT 14. A best match from the set of separated signals is determined according to matching criteria, and a visual display confirming the match may be presented to the user.

As explained above, control commands are carried in control stream multiplexed in transport stream received at DHCT 14 via the wireless receiver process discussed with respect to FIG. 7. Processing and interpretation for a voice-activated command from a user employing remote control device 480 is demarcated by reception and interpretation of a "start" control command and a "stop" control command in DHCT 14. Therefore, the aforementioned reception of a compressed audio stream, decoding thereof by speech decoder engine 920, and processing thereof by audio processing loop 927 is only effective for information enveloped by a pair of "start" and "stop" control commands.

Incoming audio buffer in memory 922 is filled at a start location with data received pursuant to reception of a start control command and no additional data is written to incoming audio buffer after reception of the stop control command. Such content in input audio buffer represents a valid voice-activated command from user. Upon reception and interpretation of a no active-speech frame command in the audio processing loop 927 that is interspersed during a valid voice-activated command from user, the speech decoder 920 stores information in R/W memory 922 specifying the start and length of time of the no-active speech frame. Processing such as filtering and signal separation, in the audio processing loop 927 is omitted for the corresponding duration of the no-active speech frame. Thus the consumption of data from the outgoing audio buffer containing the tuned channel's program audio is advanced by an amount of samples equal to the duration of no active-speech frame.

In one alternate embodiment, rather than effecting band pass filter 933 prior to signal separation 947 to filter the human speech part of the RF spectrum, signal separation 947 is performed first and then secondly by the band pass filter 933. Regardless of the order in which band pass filter 933 is performed, the band pass filter 933 may include noise filtering, as an alternative to speech spectrum filtering or as an additional option. Furthermore, the bandpass filter 933 may implement noise filtering to an extent or amount so programmed in the DSP 945 that is based on knowledge of the extent or amount of filtering performed by filter 906 in remote control device 480.

At this point, one or more of the time-shifted versions of separated and/or filtered speech streams stored in incoming audio buffer in memory 922 undergo segmentation by a speech segmentation component 955 to obtain a sequence of speech segments. The speech segmentation component 955 may be implemented as a separate component or in communication with DSP 945. Alternatively, speech segmentation component 955 may be a programmed software task in DSP 945. Speech segments output by speech segmentation component 955 are stored in sequential order in memory such that they can be compared with stored programmed voice commands in dictionary stored in memory 949 by a comparison module 935. In one embodiment comparison module is implemented by DSP 945 and in another embodiment by processor 444. In the former embodiment, speech segments output by speech segmentation component 945 are stored in R/W memory 922. If the processor 444 performs the comparison, speech segments output by speech segmentation component 945 are stored in sequential order in RAM 452. To effect this comparison, each respective speech segment of a candidate processed speech stream (i.e., the speech stream received from memory) is correlated to the digitized version of every entry stored in a dictionary stored in system memory 949. Each entry of the dictionary comprises one or more speech segments. Preferably, non-volatile memory such as FLASH memory 451 is employed to store dictionary (needs added to FIG. 3). Each entry of dictionary 458 is a set of speech segment in sequential order representing programmed voice commands preferably stored in memory 449 during a training procedure.

A matching algorithm is at the basis of finding the best dictionary entry. As a non-limiting example, a segment or sequence of segments from an input candidate stream can be matched respectively to a segment of a dictionary entry or a sequence of segments comprising a dictionary entry, in whole or in part. The matching operation yields a certainty score indicative of the closeness in match between two sequence of segments, each with the same number of segments. Non-limiting examples of matching scores include the mean-square error between two sequences or the sum of the absolute differences between the segments. Preferably, digital cross correlation as known to practitioners of digital signal processing, is performed. As discussed in greater detail below, the dictionary comprises segments stored therein during a training session with a user, such that the user's voice for various commands is stored in the dictionary for later comparison to user speech. Each unique dictionary entry or ordered combinations of dictionary entries has an associated command to effect control or interactive navigation of applications or services in DHCT 14.

More specifically, each time-shifted version of the processed speech signal comprises a sequence of speech segments that serves as a candidate to be matched to dictionary entries. Under processor 444 execution and access to and communication with memory, the comparison component 935 effects the procedure of finding the best match between the time-shifted versions of the processed speech signals and the dictionary entries. The highest matching score for a candidate sequence of speech segments is found by comparing the matching scores obtained for each dictionary entry. Thus, the best matching score for the best match for each respective time-shifted version of the processed speech signal is stored in memory. Then, the maximum of all stored matching scores is obtained by comparison. If the maximum value of all matching scores is above a threshold value, and is higher than the matching score from other candidate stream segments, the candidate steam represents a valid user command and the DHCT processor 444 instructs the DHCT's navigator 942 to perform the desired command via the action module 938. Additionally, the DHCT 14 can forward the user commands over networks to which the DHCT 14 may be connected so that the user can control other remote-controllable elements, such as other home electronic devices (e.g., digital video disk players, video cassette recorders, home security systems, thermostats, lights, and the like). If the matching score is not above the threshold, all of the candidate segments are ignored. Lastly, if more than one candidate segment's best matching score is above the threshold, and has an equal matching score to other candidate segments, the user is queried via a graphical user interface to confirm the command or to repeat the command.

The DSP 945 illustrated in FIG. 8 performs speech filtering to remove television audio from the digital signals received from the remote control device. The speech filtering enables the DHCT to obtain accurate speech signals despite of audio signals transmitted by the DHCT on electronic equipment. Therefore, where a television's audio is transmitted to the television from the DHCT, and thus an audible sound captured by the microphone 891 in remote control device 480, the television audio can be subtracted or separated from the user's voice commands as described above.

As an alternative embodiment to the use of a microphone which captures voice at a remote control device and transmits the voice to a DHCT, the present invention may also be implemented such that the microphone separately resides from a remote control device. According to one aspect of the present invention the microphone resides in the DHCT. Additionally, although it is preferred that the signals transmitted from the remote control device to the DHCT be in digital form, as described in detail above, analog methods analogous to those used in residential portable telephones, such as amplitude modulated RF carriers, frequency modulated RF carriers, and digital or analog spread spectrum RF carriers, may likewise be used. Moreover, privacy-enhancing techniques such as encryption and/or digital spread spectrum technology, as are well known in the art, may be applied to the microphone signals to avoid interference with nearby communications or intentional and/or unintentional eavesdropping.

V. Training Procedure

The dictionary 458 entries comprise of a digitized sequence of speech segments, each uniquely associated with a command for navigation or control of DHCT 14. Dictionary entries and associated command association are preferably constructed during a user training procedure. Upon user input with input device 480, the processor 444 effects display 448 of a graphical user interface (GUI), preferably a set-up menu, via output system onto the display 441. The interaction between GUI display and user input proceeds by user entering a second input to select one of a plurality of selectable options in displayed settings menu in GUI. Upon selecting training for speech control navigation among the displayed options, the training procedure to construct or modify the dictionary and command associations for voice-activation control of DHCT 14 is entered.

Immediately after entering training procedure, either the processor 444 or the DSP 945, or both in communication with each other, effect mute of tuned program audio playback by disabling input of module 953 or program audio decoder 598. The DSP 945 enables audio playback module 953 to receive audio samples from DSP 945. Thereafter, DSP 945 generates pinknoise audio samples and outputs them to audio playback module 953 to activate the pinknoise sound through speakers 930. Although pinknoise sound is emitted by the speakers, tuned program audio is not.

Thereafter, a first screen displayed in a GUI on display 441 instructs the user not to speak and to press a first button, such as "enable microphone" button 893, on input device 480 as the signal to initiate training procedure. Thus, a start control command is transmitted. Thereafter, encoding of speech signal transmission in input device 480 is enabled. Filtering by filter 906 at input device is set with settings for band-pass-filtering of pinknoise. Pinknoise is typically a buzz sound with specific audio signal characteristics that facilitates measurement of distance from speaker to DHCT 14. Therefore, the process 897 described with reference to FIG. 6 is active. Upon reception and interpretation of "start" control command, either the processor 444 or the DSP 945, or both in communication with each other, effect enabling of reception of speech signal in DHCT 14 via the wireless channel receiver process 925 of FIG. 7. Since pinknoise is emitted by speakers 930 and user has been instructed to not speak, received compressed audio signal at DHCT 14 is decoded by speech decoder 920. The decoded stream output by speech decoder 920 comprises of the pinknoise signal emitted.

Generation of pink noise output through speakers 930 is effected with pulses of different durations (that is, an on-state or buzz state), preferably interspersed by intervals of same time duration (that is, an off-state). Initially, the pinknoise pulse is emitted with a long on-state. In one alternate embodiment, the off-state is transmitted as a no-active speech frame. The processor 444 or DSP 945 employ the timer 590 to record time in memory 922 and to measure the time between emission and reception of the signal and in this manner the delay between audio emission by the DHCT 14 and its return to the DHCT 14 is estimated. The actual delay time estimated varies with the distance between the input device 480 and the DHCT 14. Therefore, according to one aspect of the invention the actual distance calculation is irrelevant.

At the end of emission of the initial long pinknoise pulse, the DSP's 945 first record of time in memory 922 is effected upon termination. Immediately thereafter, the DSP 945 starts analysis of incoming decoded audio signal stored in incoming audio buffer in memory 922 to detect the absence of pinknoise. Upon detecting absence of pinknoise in the decoded audio signal by detecting a significant reduction in the value of the audio samples (or similarly by detecting a significant reduction in the signal's energy), the DSP 945 records a second time in the memory 922. The difference between the second and first recorded times provides as an initial delay estimate incurred between emitted audio via speakers 930 and reception of the same audio in DHCT 14.

Thereafter, the DSP 945 effects start and termination of generation of varied-length pinknoise pulses 925 and records their respective start and stop times. Likewise, the DSP 945 records the start and termination of the incoming pinknoise pulses received via receiver pipeline 925. Using the initial delay estimate as a guide to match an incoming pulse to the correspond outgoing pulse, and using knowledge of the unique duration of a pulse during this second phase of pinknoise pulse emission, the DSP 945 computes additional delay estimates to refine the overall delay estimate and tolerance. During this refinement phase, DSP 945 matches pulses and computes their start time delay and stop time delay. The difference in times become estimates of the roundtrip delay between DHCT 14 and the remote control device 480. The DSP 945 performs to obtain the average of all roundtrip delay estimates and also computes the standard deviation among all estimates to be used as tolerance.

Therefore, buffering of program audio as previously described can be honed in on a time-shift delay centered at the estimated average roundtrip delay with the pinknoise emission training. A small number of positive and negative time-shift from the estimated average roundtrip delay are employed as tolerance values. The tolerance can be based to a certain number of standard deviations away from the average. The incorporation of tolerance serves to overcome for errors in the delay estimation and to allow for alternate location of the input device 480 in the future during regular operation. Hence, the time-shifted versions of the past program audio stored in circular buffer in the memory 922 reflects the calculated delay and error tolerance. In an alternate embodiment, error tolerance in calculated delay is employed for cancellation of room reverberation effects. As a result, significant audio interference may be separated from the digital speech signal received from the remote control device 480. Based on the difference in amplitude between the samples of pinknoise audio received and their respective emitted versions stored in the outgoing audio buffer, the DSP 945 proceeds to compute an estimate of signal degradation for the outgoing audio program. An estimate of signal degradation 951 is stored in memory 922 and used during regular operation to assist in processing of the incoming audio signal in audio processing loop 927.

Reminding the user to continue not to speak via displayed GUI presentation, program audio decode and playback is enabled by activating the decoder 598 and playback components 953. Either or both filter 906 or filter 933, in input device 480 and DHCT 14, respectively, are set to settings to filter out ambient noise. The program audio is buffered in outgoing audio buffer in the memory 922. During this part of the training, the estimated delay is employed to compare the transmitted program audio with the version that propagated back to DHCT 14. It should be noted that the program audio was picked up by the microphone 891, encoded and transmitted as described with reference to FIG. 6, then received by wireless channel receiver 925 and decoded by speech decoder 920. Each of the components processing the signal induced a certain level of degradation. By comparing the samples of the original version of the program audio with the version decoded by the speech decoder 920, the cumulative degradation on the audio signal can be estimated and stored as an estimate of signal degradation 951. Signal degradation can be estimated with typical signal to noise calculations as well known in digital signal processing. The signal degradation estimate can then be employed to assist in the process of processing the incoming audio signal in the audio processing loop 927. For instance, the signal degradation estimate can aid in separation of the program audio from user speech during regular operation of voice activated control and navigation of DHCT 14.

During the subsequent phase of the training procedure, without emission of pinknoise pulses and with program audio muted as explained above, the user is asked to speak certain words through the presentation of a displayed GUI. The GUI may present a list of predetermined words be asked to speak any word the user wishes to become voice-activation commands. Both filtering, at filter 906 of the remote control device 480 and filter 933 at DHCT 14, are set to band pass human speech signal. The user may be asked to speak the same word multiple times to obtain an averaged version or different versions of the same word to be stored in the dictionary 458.

The user may be asked whether user wishes more than one word associated with the current voice-activated command being trained. Hence, the training procedure allows for a sequence of one or more spoken words to be associated with a single voice-activated command. The user is then asked to enter input to select a machine-state (or navigation step) representing an action in DHCT 14 for which the user wishes to associate the current word (or set of words) for voice-activation command during regular operation in future. The user may be asked whether user wishes more than one action or command to be associated with the current word (or set of words) for the voice-activated command being trained. Hence, the training procedure allows for a sequence of one or more actions to be performed in DHCT 14 to be associated with a voice-activated command. Alternatively, they can be associated with a sequence of one or more spoken words.

For each voice-activated command, an entry is stored in dictionary 458 in memory 451. Each dictionary entry comprises of one or more versions of the user spoken word or set of words to be recognized as the voice-activated command. Additionally, each dictionary entry has an association to one or more actions to be implemented in the DHCT 14 upon interpretation of a voice-activated command. In an alternate embodiment, the training procedure associates one of multiple dictionaries with each respective user from a plurality of users that undergo the training procedure. A user may need to notify the DHCT 14 with a voice-activated command the user's identity. Hence, a user's identity, such as user's name, is also trained during the training procedure and further associated with one of a plurality of user dictionaries. Alternatively, a user enters user's identity through user input, key strokes on the remote control device 480, by navigating through displayed GUI or menus and a user's dictionary remains effective throughout the future until changed.

FIG. 9 is a flowchart of a training procedure 901 implemented by DHCT 14. Procedure 901 begins at block 950, where DHCT 14 receives a request to initiate a training procedure. Next, at block 960, the DHCT mutes the audio of TV program provided by DHCT 14. After muting the audio, processing then continues at block 970, where DHCT 14 receives a digitized audio stream, which is processed by DHCT at block 980. Next, at block 990, the processed audio is stored by DHCT in association with a television navigation function. Procedure 901 is then complete.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for training voice activation control of a television program processing device (TPPD), comprising:
receiving a first input from a user corresponding to a request for a training procedure;
responsive to receiving the first input, muting audio of a tuned television program in the TPPD;
receiving a digitized audio signal (DAS) at a receiver of the TPPD after muting the audio of the tuned television program at the TPPD;
processing the DAS received at the TPPD;
storing the processed DAS (PDAS) in the TPPD; and
associating the stored PDAS with functionality of the TPPD that corresponds to television navigation.

2. The method of claim 1, wherein the first input is received while the TPPD is tuned to the television program.

3. The method of claim 1,
wherein the DAS received at the TPPD includes compressed data.

4. The method of claim 3, wherein processing of the DAS received at the TPPD includes decompressing the compressed data included in the received DAS.

5. The method of claim 4, wherein the DAS received at the TPPD includes one or more spoken words provided by the user, and wherein at least a portion of the decompressed data in the TPPD corresponds to the one or more spoken words provided by the user.

6. The method of claim 1, further comprising responsive to receiving the first input, providing to the user information to enable microphone functionality.

7. The method of claim 6, further comprising responsive to providing the user information to enable the microphone functionality, enabling the microphone functionality in a television remote control device (TRCD).

8. The method of claim 7, further comprising receiving from the user a second user input corresponding to a selection of a television navigation command (TNC), and associating the user-selected TNC with the stored PDAS in the TPPD, wherein at least a portion of the DAS received at the TPPD includes one or more spoken words provided by the user.

9. The method of claim 8, wherein the one or more spoken words provided by the user included in the DAS received at the TPPD are provided while the audio of the tuned television program in the TPPD is muted.

10. The method of claim 7, further comprising receiving one or more spoken words provided by the user after enabling the microphone functionality in the TRCD, and processing the one or more spoken words provided by the user in the TRCD, wherein the DAS received at the TPPD is emitted by the TRCD, and wherein the DAS received at the TPPD includes the one or more spoken words provided by the user.

11. The method of claim 1, wherein the DAS received at the TPPD includes a start command.

12. The method of claim 11, wherein the DAS received at the TPPD further includes, after the start command, one or more spoken words provided by the user.

* * * * *